(12) United States Patent
Glickman et al.

(10) Patent No.: US 9,258,534 B2
(45) Date of Patent: Feb. 9, 2016

(54) IMAGE-BASED INVENTORY CONTROL SYSTEM AND METHOD

(71) Applicant: Snap-on Incorporated, Kenosha, WI (US)

(72) Inventors: Stephen L. Glickman, Los Gatos, CA (US); David A. Jackson, Point Roberts, WA (US); Matthew J. Lipsey, Sherwood, AR (US); Preston Phillips, Conway, AR (US); David C. Fly, Maumelle, AR (US); Jason L. Weeks, Maumelle, AR (US)

(73) Assignee: SNAP-ON INCORPORATED, Kenosha, WI (US)

( * ) Notice: Subject to any disclaimer, the term of this patent is extended or adjusted under 35 U.S.C. 154(b) by 0 days.

(21) Appl. No.: 14/668,793

(22) Filed: Mar. 25, 2015

(65) Prior Publication Data

US 2015/0201166 A1    Jul. 16, 2015

Related U.S. Application Data

(63) Continuation of application No. 12/484,127, filed on Jun. 12, 2009, now Pat. No. 9,041,508.

(60) Provisional application No. 61/087,565, filed on Aug. 8, 2008.

(51) Int. Cl.
*G05B 19/00*    (2006.01)
*G05B 23/00*    (2006.01)
(Continued)

(52) U.S. Cl.
CPC ............... *H04N 7/181* (2013.01); *B25H 3/00* (2013.01); *B25H 3/028* (2013.01); *G06Q 10/087* (2013.01); *H04N 7/18* (2013.01)

(58) Field of Classification Search
CPC ............. G06Q 10/087; G06Q 20/203; G06Q 10/0875; G03B 7/16; G03B 15/02; G03B 15/05
USPC ..................................................... 340/3.1–3.2
See application file for complete search history.

(56) References Cited

U.S. PATENT DOCUMENTS 4,065,776 A * 12/1977 Iwata ...................... G03B 7/16
                                                                        395/155
4,213,681 A *  7/1980 Hayata ................... G03B 15/05
                                                                        396/207

(Continued)

FOREIGN PATENT DOCUMENTS

CN    101187557 A    5/2008
EP       060441 A1    9/1982

(Continued)

OTHER PUBLICATIONS

Chinese Office Action issued in Chinese Application No. 200980140152.9 dated Sep. 30, 2014, with English Translation.

(Continued)

*Primary Examiner* — Steven Lim
*Assistant Examiner* — Muhammad Adnan
(74) *Attorney, Agent, or Firm* — McDermott Will & Emery LLP

(57) ABSTRACT

Systems and methods for determining an inventory condition of objects based on captured images are described. An exemplary inventory control system or method utilizes a highly efficient and economical approach to apply suitable imaging parameters for capturing images of a storage drawer being accessed by a user, or for manipulating the captured images of the drawer. An inventory condition of the drawer is determined based on the captured images or manipulated images.

13 Claims, 18 Drawing Sheets

(51) Int. Cl.

| | | |
|---|---|---|
| *G06F 7/00* | (2006.01) | |
| *G06F 7/04* | (2006.01) | |
| *G08G 1/017* | (2006.01) | |
| *G06K 9/00* | (2006.01) | |
| *G06K 9/42* | (2006.01) | |
| *G06K 9/40* | (2006.01) | |
| *G06K 9/38* | (2006.01) | |
| *G06K 9/32* | (2006.01) | |
| *G06G 1/14* | (2006.01) | |
| *H04N 7/18* | (2006.01) | |
| *G06Q 10/08* | (2012.01) | |
| *B25H 3/00* | (2006.01) | |
| *B25H 3/02* | (2006.01) | |

(56) References Cited

U.S. PATENT DOCUMENTS

| | | | | |
|---|---|---|---|---|
| 4,395,101 | A * | 7/1983 | Morimoto | G03B 7/16 396/144 |
| 5,287,414 | A | 2/1994 | Foster | |
| 5,369,261 | A | 11/1994 | Shamir | |
| 5,376,962 | A * | 12/1994 | Zortea | G06T 5/007 348/222.1 |
| 5,378,883 | A * | 1/1995 | Batterman | G06K 7/10881 235/455 |
| 5,432,585 | A * | 7/1995 | DiRisio | G03B 7/16 396/195 |
| 5,546,156 | A * | 8/1996 | McIntyre | G03B 17/06 396/106 |
| 5,725,096 | A | 3/1998 | Winnard | |
| 5,821,993 | A | 10/1998 | Robinson | |
| 5,931,781 | A | 8/1999 | De Boer | |
| 6,109,774 | A * | 8/2000 | Holmes | G07F 11/62 221/12 |
| 6,510,522 | B1 | 1/2003 | Heinrich et al. | |
| 6,707,381 | B1 | 3/2004 | Maloney | |
| 6,816,625 | B2 * | 11/2004 | Lewis, Jr. | H04N 5/217 348/E5.078 |
| 6,827,275 | B2 | 12/2004 | Allen | |
| 6,840,451 | B2 | 1/2005 | Allen | |
| 6,989,747 | B2 | 1/2006 | Konecnik | |
| 7,256,682 | B2 | 8/2007 | Sweeney, II | |
| 7,317,393 | B2 | 1/2008 | Maloney | |
| 7,336,174 | B1 | 2/2008 | Maloney | |
| 7,920,722 | B2 | 4/2011 | Mita et al. | |
| 8,199,246 | B2 | 6/2012 | Ono | |
| 8,353,456 | B2 | 1/2013 | Jackson et al. | |
| 2002/0143672 | A1 | 10/2002 | Sawasaki | |
| 2003/0001466 | A1 | 1/2003 | Herrington | |
| 2003/0095710 | A1* | 5/2003 | Tessadro | G06T 7/0083 382/199 |
| 2003/0142085 | A1* | 7/2003 | Taniguchi | G09G 3/3406 345/204 |
| 2004/0027578 | A1* | 2/2004 | Drake, Jr. | G01B 11/161 356/502 |
| 2004/0113786 | A1 | 6/2004 | Maloney | |
| 2004/0190092 | A1* | 9/2004 | Silverbrook | G06F 3/0317 358/539 |
| 2004/0207512 | A1 | 10/2004 | Bastian | |
| 2005/0086514 | A1 | 4/2005 | Han et al. | |
| 2007/0023193 | A1 | 2/2007 | King | |
| 2007/0067203 | A1 | 3/2007 | Gil et al. | |
| 2007/0135965 | A1 | 6/2007 | Nguyen et al. | |
| 2008/0059338 | A1 | 3/2008 | Hubbard | |
| 2008/0088454 | A1 | 4/2008 | Flores et al. | |
| 2009/0060349 | A1 | 3/2009 | Linaker et al. | |
| 2009/0063306 | A1 | 3/2009 | Fano et al. | |
| 2009/0231483 | A1 | 9/2009 | Seddik et al. | |

FOREIGN PATENT DOCUMENTS

| | | | |
|---|---|---|---|
| EP | 0 363 350 A1 | 4/1990 | |
| EP | 1030521 A1 | 8/2000 | |
| EP | 1335586 A2 | 8/2003 | |
| EP | 1 783 570 A1 | 5/2007 | |
| EP | 1860041 A1 | 11/2007 | |
| EP | 2014424 A1 | 1/2009 | |
| JP | 2001-294308 A | 10/2001 | |
| JP | 2003-090661 A | 3/2003 | |
| JP | 2006-103852 A | 4/2006 | |
| WO | 95/27252 A1 | 10/1995 | |
| WO | 01/09820 A2 | 2/2001 | |
| WO | 02/13136 A2 | 2/2002 | |
| WO | 2006/106509 A2 | 10/2006 | |
| WO | 2007/118272 A1 | 10/2007 | |
| WO | 2008/029159 A1 | 3/2008 | |
| WO | WO 2008029159 A1 * | 3/2008 | ........... G06Q 10/087 |
| WO | 2008/112731 A2 | 9/2008 | |

OTHER PUBLICATIONS

Chinese Office Action issued in Chinese Application No. 200980137855.6 dated Jun. 5, 2014, with English Translation.
Chinese Office Action issued in Chinese Application No. 200980140153.3 dated Feb. 26, 2014, with English Translation.
Chinese Office Action issued in Chinese Application No. 200980140153.3 dated Apr. 25, 2014, with English Translation.
Chinese Office Action issued in Chinese Application No. 200980137705.5 dated Jan. 13, 2014, with English Translation.
Chinese Office Action issued in Chinese Application No. 200980140152.9 dated Sep. 3, 2013, with English Translation.
Chinese Office Action issued in Chinese Application No. 200980140152.9 dated Apr. 10, 2014, with English Translation.
Chinese Office Action issued in Chinese Application No. 200980137855.6 dated Nov. 29, 2013.
Chinese Office Action issued in Chinese Application No. 200980140153.3 dated Oct. 23, 2013.
Chinese Office Action issued in Chinese Application No. 200980137705.5 dated Jun. 7, 2013, with English Translation.
Chinese Office Action for Application No. 200980137855.6 dated Apr. 11, 2013.
Chinese Office Action issued in Chinese Patent Application No. 200980137705.5 dated Feb. 5, 2013.
Chinese Office Action issued in Chinese Patent Application No. 200980140153.3 dated May 16, 2012.
Chinese Office Action issued in Chinese Patent Application No. 200980137705.5 dated Apr. 28, 2012.
European Extended Search Report issued in Application No. 09805639.3-1955 dated Apr. 16, 2014.
Extended European Search Report issued in European Patent Application No. 09805641.9 dated Oct. 19, 2012.
Extended European Search Report issued in European Patent Application No. 09805644.3 dated Sep. 19, 2011.
Extended European Search Report issued in European Patent Application No. 09805642.7 dated Sep. 19, 2011.
European Office Action issued in European Application No. 09805642.7-1955 dated Jul. 4, 2013.
European Office Action issued in European Application No. 09 805 644.3-1955 dated Jul. 3, 2013.
International Search Report and Written Opinion issued in International Patent Application No. PCT/US2009/053229, dated Oct. 20, 2011.
International Search Report issued in International Patent Application No. PCT/US2009/053230 dated Dec. 1, 2010.
International Search Report and Written Opinion issue in International Patent Application No. PCT/US2009/053232, mailed Nov. 1, 2010.
U.S. Office Action issued in U.S. Appl. No. 12/484,138 dated Mar. 14, 2014.
U.S. Office Action issued in U.S. Appl. No. 12/523,100 dated Sep. 28, 2011.
United States Office Action issued in U.S. Appl. No. 12/484,139 dated Dec. 30, 2013.
United States Office Action issued in U.S. Appl. No. 12/484,138 dated Oct. 2, 2013.
United States Office Action issued in U.S. Appl. No. 13/741,207 dated Jun. 14, 2013.

(56) References Cited

OTHER PUBLICATIONS

US Office Action issued in U.S. Appl. No. 12/484,138 dated Feb. 20, 2013.
US Office Action issued in U.S. Appl. No. 12/538,100 on Jun. 5, 2012.
U.S. Office Action issued in U.S. Appl. No. 12/484,139 dated Jan. 19, 2012.
U.S. Office Action issued in U.S. Appl. No. 13/741,207 dated Jul. 14, 2014.
U.S. Office Action issued in U.S. Appl. No. 12/484,127 dated Mar. 28, 2014.
U.S. Office Action issued in U.S. Appl. No. 12/484,127, dated Feb. 16, 2012.
Notification Concerning Transmittal of International Preliminary Report on Patentability issued in International Application No. PCT/US2009/053227 dated Aug. 8, 2013.
Notification of Transmittal of the International Search Report and the Written Opinion of the International Searching Authority issued in International Application No. PCT/US2009/053227 mailed Jul. 23, 2013.
Worksmart Systems, Inc.—Foreign Object Damage (FOD) Tool Control Cabinet (www.worksmartsystems.com <http://www.worksmartsystems.com>), 2pgs., 2006.
Notice of Allowance issued in corresponding U.S. Appl. No. 12/484,138 dated May 8, 2015.
Notice of Allowance issued in corresponding U.S. Appl. No. 13/741,207 dated May 6, 2015.
European Office Action issued in Application No. 09805641.9 dated Mar. 16, 2015.
Chinese Decision of Rejection issued in Application No. 200980140152.9 dated Apr. 3, 2015 with English Translation.

* cited by examiner

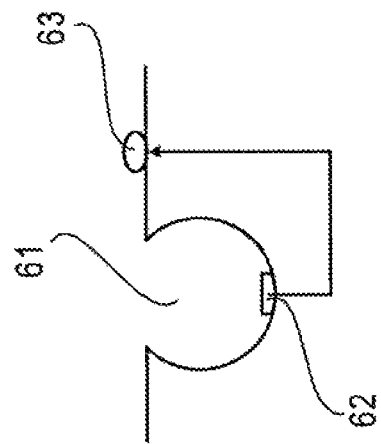
FIG. 6B
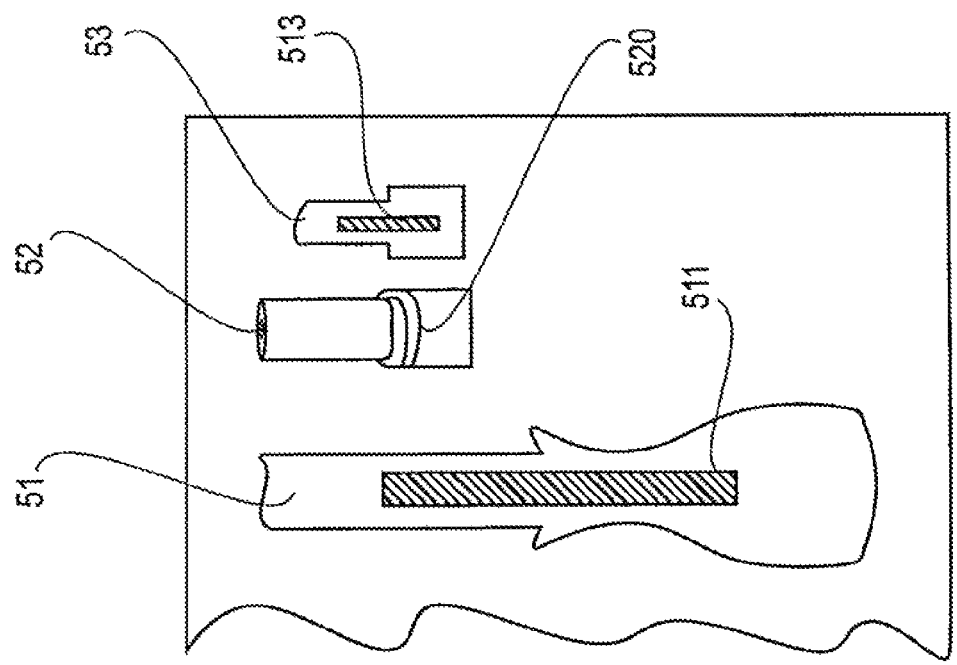
FIG. 6A
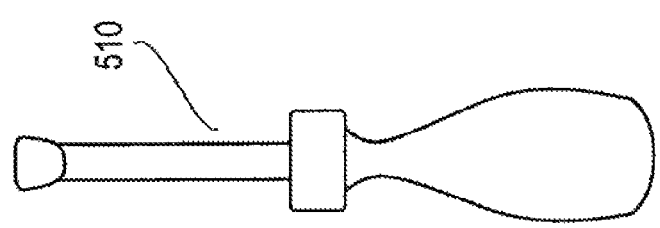

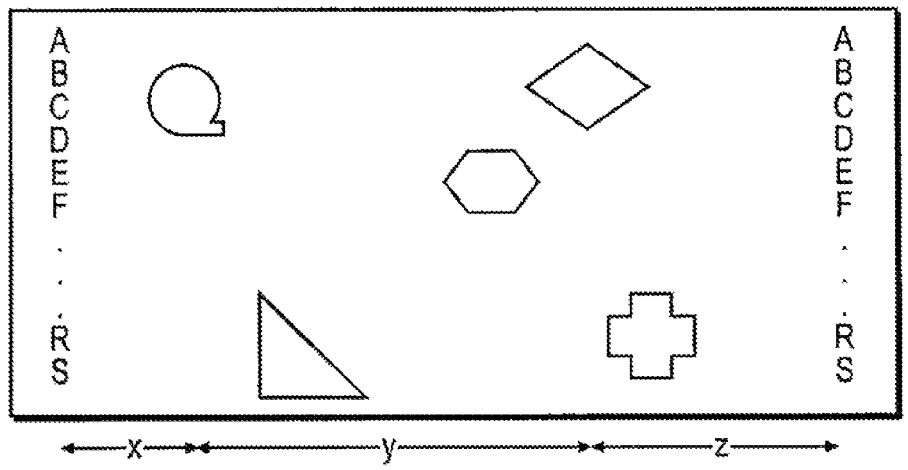
FIG. 7A Full Drawer
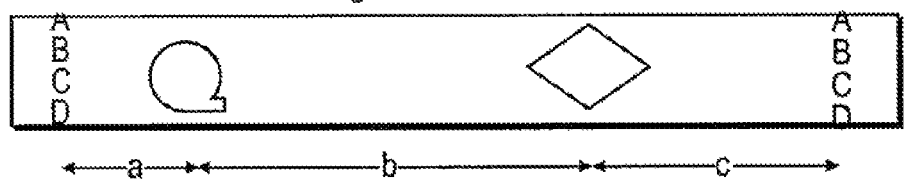
FIG. 7B Partial Image 1
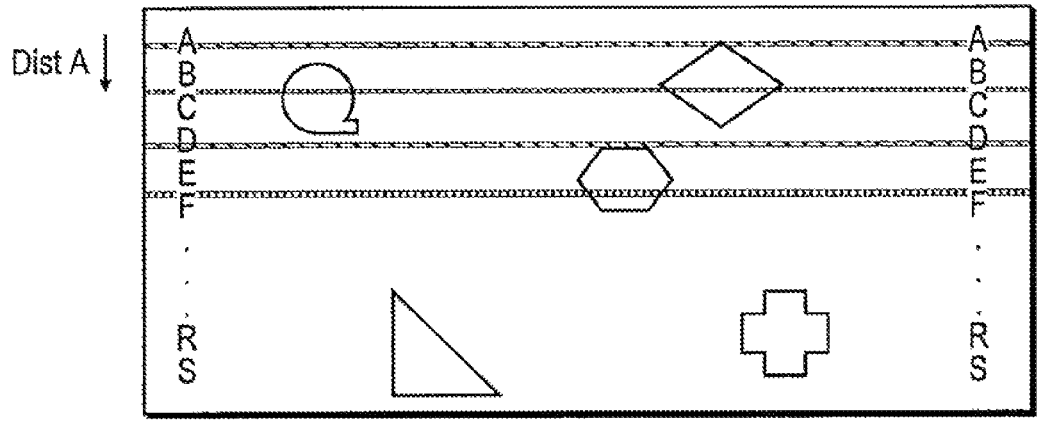
FIG. 7C : Black = Full drawer, Green = Partial 1, Red = Partial 2

FIG. 7D: Perspective partial Drawer image
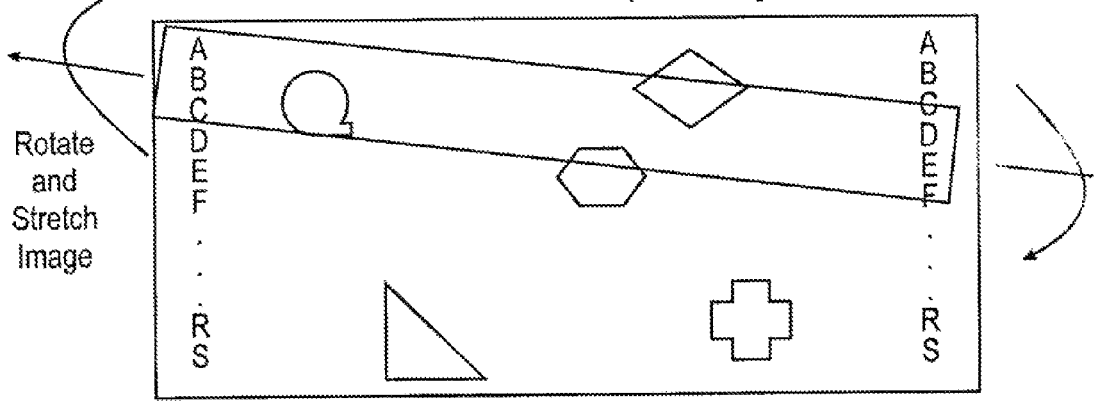
FIG. 7E: Rotated and Stretched partial image to fit in full drawer
Rotate and Stretch Image

AUDIT TRACK

| Date / Time | Employee Name |
|---|---|
| 7/31/2008 5:31:12 PM | Andy Mechanic |
| 7/31/2008 3:38:04 PM | Mike Gill |
| 7/31/2008 10:49:04 AM | David Jackson |
| 7/31/2008 9:14:04 AM | Joe Chwan |
| 7/31/2008 8:40:04 AM | Andy Mechanic |
| 7/30/2008 6:37:04 PM | David Jackson |
| 7/30/2008 1:59:04 PM | David Jackson |
| 7/30/2008 11:02:12 AM | Mike Gill |
| 7/30/2008 10:01:43 AM | Joe Chwan |
| 7/30/2008 9:45:24 AM | Mike Gill |
| 7/30/2008 9:28:16 AM | David Jackson |
| 7/30/2008 8:54:27 AM | Joe Chwan |
| 7/30/2008 7:31:18 AM | David Jackson |

FIG. 10A

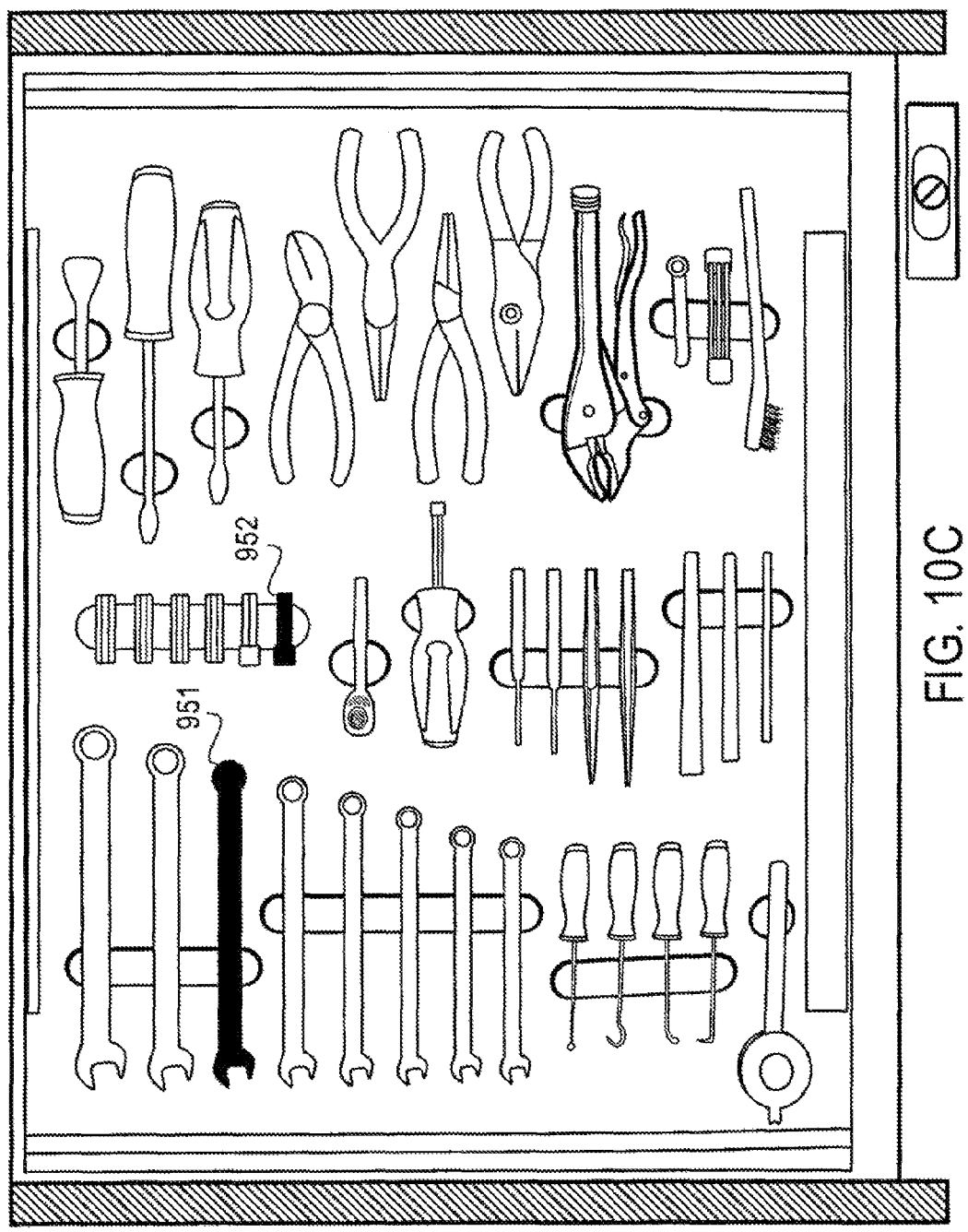

IMAGE-BASED INVENTORY CONTROL SYSTEM AND METHOD

RELATED APPLICATIONS

This application is a continuation of U.S. application Ser. No. 12/484,127, entitled IMAGE-BASED INVENTORY CONTROL SYSTEM AND METHOD and filed on Jun. 12, 2009, which claims the benefit of priority from provisional patent application No. 61/087,565, entitled IMAGE-BASED INVENTORY CONTROL SYSTEM and filed on Aug. 8, 2008, the disclosures of which are incorporated herein in their entireties.

FIELD OF DISCLOSURE

The present disclosure relates to an inventory control system, more specifically, to an image-based inventory control system for determining an inventory condition of objects stored in the system, based on captured images of various storage locations of the system.

BACKGROUND AND SUMMARY OF THE DISCLOSURE

When tools are used in a manufacturing or service environment, it is important that tools be returned to a storage unit, such as a tool box, after use. Employers typically perform a manual inventory check of the tool box to minimize or eliminate the problem of misplacement or theft of expensive tools. Companies can conduct random audits of employee's toolbox to prevent theft and monitor tool location.

Some industries have high standards for inventory control of tools, for preventing incidents of leaving tools in the workplace environment where they could cause severe damages. For the aerospace industry, it is important to ensure that no tools are accidentally left behind in an aircraft or missile being manufactured, assembled or repaired. The Aerospace Industries Association even establishes a standard called National Aerospace Standard including recommended procedures, personnel management and operations to reduce foreign object damage (FOD) to aerospace products. FOD is defined as any object not structurally part of the aircraft. The most common foreign objects found are nuts, bolts, safety wire, and hand tools. Inventory control over tools is critical to prevent tools from being left in an aircraft.

Some toolboxes include build-in inventory determination features to track inventory conditions of tools stored in those toolboxes. For example, some toolboxes dispose contact sensors, magnetic sensors or infrared sensors in or next to each tool storage locations, to detect whether a tool is placed in each tool storage location. Based on signals generated by the sensors, the toolboxes are able to determine whether any tools are missing. While this type of inventory check may be useful to some extents, it suffers from various drawbacks. For instance, if a sensor detects that something is occupying a storage location, the toolbox will determine that no tool is missing from that storage location. However, the toolbox does not know whether the right kind of tool is indeed placed back in the toolbox or it is just some objects placed in the storage location to cheat the system. Furthermore, disposing sensors for numerous storage locations in a toolbox is tedious and costly, and the large number of sensors is prone to damages or malfunctions which will produce false negative or positive alarms.

Accordingly, there is a need for an effective inventory control system that that could assist tracking and accounting for usage of tools and whether they are properly put back after usage. There is also a need for an inventory control system which knows exactly what tool is removed or returned to a tool box. Furthermore, as multiple workers may have access to the same tool box, there is another need for an inventory control system that can track a user and his or her usage of tools, to determine responsibilities for any tool loss or misplacement.

This disclosure describes various embodiments of highly automated inventory control systems that utilize unique machine imaging and methodology for identifying an inventory condition in the storage unit. Illustrative features include the ability to process complex image data with efficient utilization of system resources, autonomous image and camera calibrations, identification of characteristics of tools from image data, adaptive timing for capturing inventory images, efficient generation of reference data for checking inventory status, autonomous compensation of image quality, etc.

An exemplary inventory control system or method according to this disclosure utilizes a highly efficient and economical approach to apply suitable imaging parameters for capturing images of a storage drawer being accessed by a user or manipulating the captured images of the drawer. An inventory condition of the drawer is determined based on the captured images or manipulated images. The system includes a plurality of storage drawers for storing objects; an image sensing device configured to capture images of the drawers; a data storage device storing imaging parameters corresponding to each storage drawer; and a data processor is configured to: determine an identity of a drawer being accessed by the user; access the imaging parameters corresponding to the determined identity of the drawer, wherein the imaging parameters are used by the image sensing device in capturing an image of the drawer being accessed by the user or used by the data processor to manipulate the captured image of the drawer being accessed by the user; and determine an inventory condition of the objects stored in the storage drawer according to the captured image or manipulated image.

In one aspect, the data processor determines the identity of the storage drawer according to an identifier unique to each storage drawer or a state of a signal generated by a sensor. In another aspect, the imaging parameters include at least one of exposure parameters, shutter parameters, illumination parameters and color gains. The imaging parameters are pre-stored in the data storage device or accessible by the system via a data transmission network or a removable storage device attached to the system.

The exemplary systems and method as described herein may be implemented using one or more computer systems and/or appropriate software.

It is understood that embodiments, steps and/or features described herein can be performed, utilized, implemented and/or practiced either individually or in combination with one or more other steps, embodiments and/or features.

Additional advantages and novel features of the present disclosure will be set forth in part in the description which follows, and in part will become apparent to those skilled in the art upon examination of the following, or may be learned by practice of the present disclosure. The embodiments shown and described provide an illustration of the best mode contemplated for carrying out the present disclosure. The disclosure is capable of modifications in various obvious respects, all without departing from the spirit and scope thereof. Accordingly, the drawings and description are to be regarded as illustrative in nature, and not as restrictive. The advantages of the present disclosure may be realized and attained by means of the instrumentalities and combinations particularly pointed out in the appended claims.

BRIEF DESCRIPTION OF THE DRAWINGS

The present disclosure is illustrated by way of example, and not by way of limitation, in the accompanying drawings, wherein elements having the same reference numeral designations represent like elements throughout and wherein:

FIGS. 6a and 6b are exemplary identifier designs for use in this disclosure;

FIGS. 7a-7e and 8a-8d illustrates examples of image calibration;

FIGS. 10a-10d are illustrative images of an exemplary audit record and images taken during access to an exemplary system according to this disclosure.

DETAILED DESCRIPTIONS OF ILLUSTRATIVE EMBODIMENTS

In the following description, for the purposes of explanation, numerous specific details are set forth in order to provide a thorough understanding of the present disclosure. Specifically, operations of illustrative embodiments that utilize machine vision to identify inventory conditions of a storage unit are described in the context of tool management and tool inventory control. It will be apparent, however, to one skilled in the art that concepts of the disclosure may be practiced or implemented without these specific details. Similar concepts may be utilized in other types of inventory control systems such as warehouse management, jewelry inventory management, sensitive or controlled substance management, mini bar inventory management, drug management, vault or security box management, etc. In other instances, well-known structures and devices are shown in block diagram form in order to avoid unnecessarily obscuring the present disclosure. As used throughout this disclosure, the terms "a captured image", "captured images", "an image", or "images" of an object, an area or a drawer are defined as an image of the entire object, area or drawer, or a partial image of the object, area or drawer.

Overview of Exemplary Inventory Control Systems

Figure 1A:
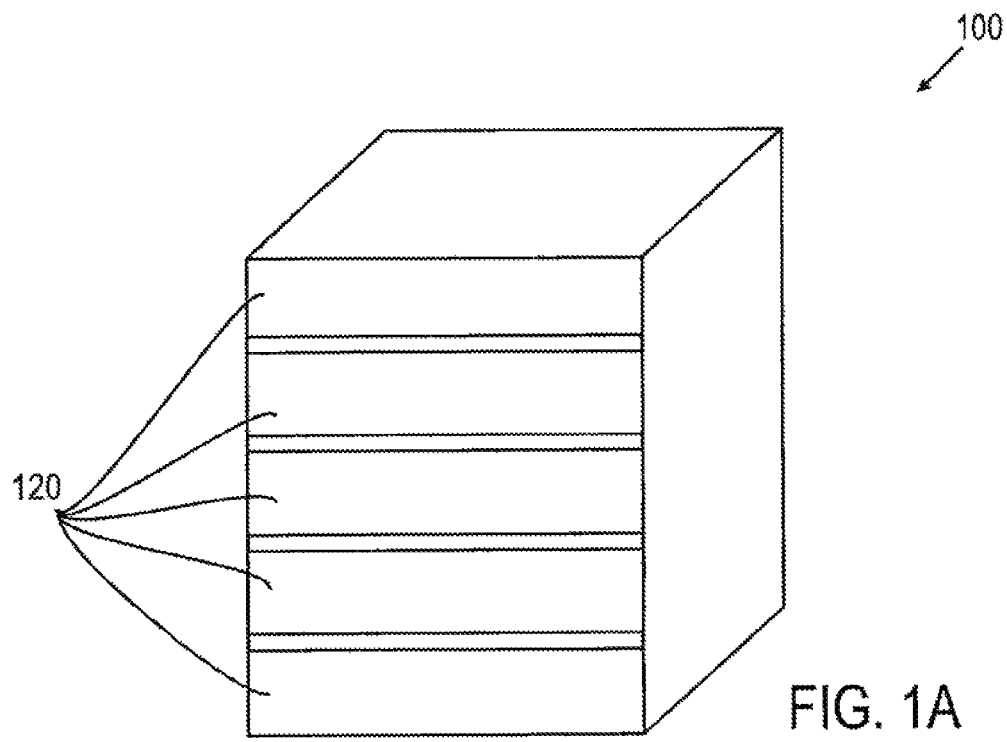
FIGS. 1a and 1b show exemplary storage units in which embodiments according to this disclosure may be implemented.
Figure 1B:
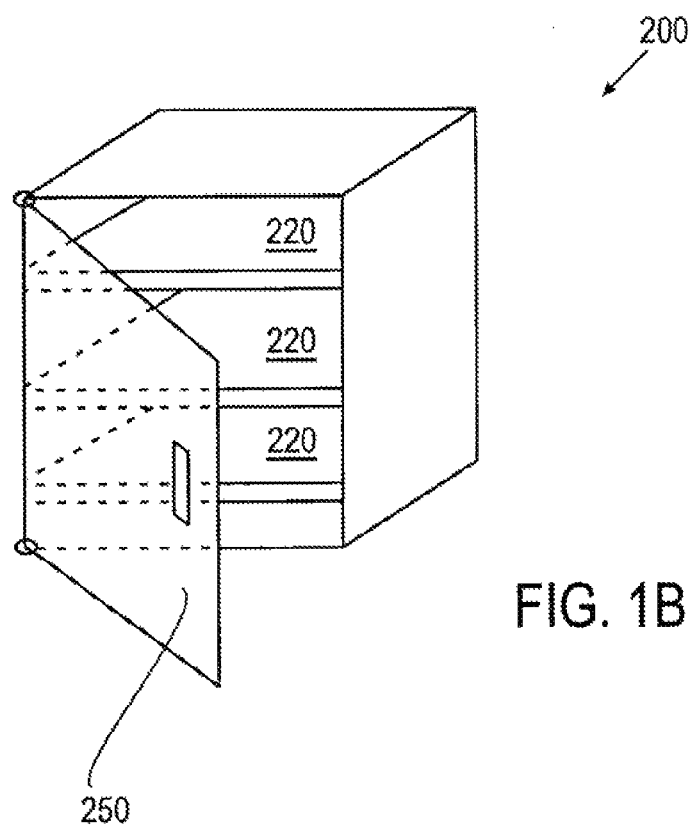

FIGS. 1a and 1b show exemplary storage units in which inventory control systems according to this disclosure may be implemented. FIG. 1a is an exemplary tool storage system 100 including multiple storage drawers 120. Each storage drawer 120 includes multiple storage locations for storing various types of tools. As used throughout this disclosure, a storage location is a location in a storage system for storing or securing objects. In one embodiment, each tool has a specific pre-designated storage location in the tool storage system.

Each storage drawer operates between a close mode, which allows no access to the contents of the drawer, and an open mode, which allows partial or complete access to the contents of the drawer. When a storage drawer moves from a close mode to an open mode, the storage drawer allows increasing access to its contents. On the other hand, if a storage compartment or drawer moves from an open mode to a close mode, the storage drawer allows decreasing access to its contents. As shown in FIG. 1a, all storage drawers 120 are in close mode.

A locking device may be used to control access to the contents of the drawers 120. Each individual drawer 120 may have its own lock or multiple storage drawers 120 may share a common locking device. Only authenticated or authorized users are able to access to the contents of the drawers.

The storage drawers may have different sizes, shapes, layouts and arrangements. FIG. 1b shows another type of tool storage system 200 which includes multiple storage shelves or compartments 220 and a single door 250 securing access to the storage shelves 250. The storage shelves or compartments may come in different sizes, shapes, layouts and arrangements.

Figure 2:
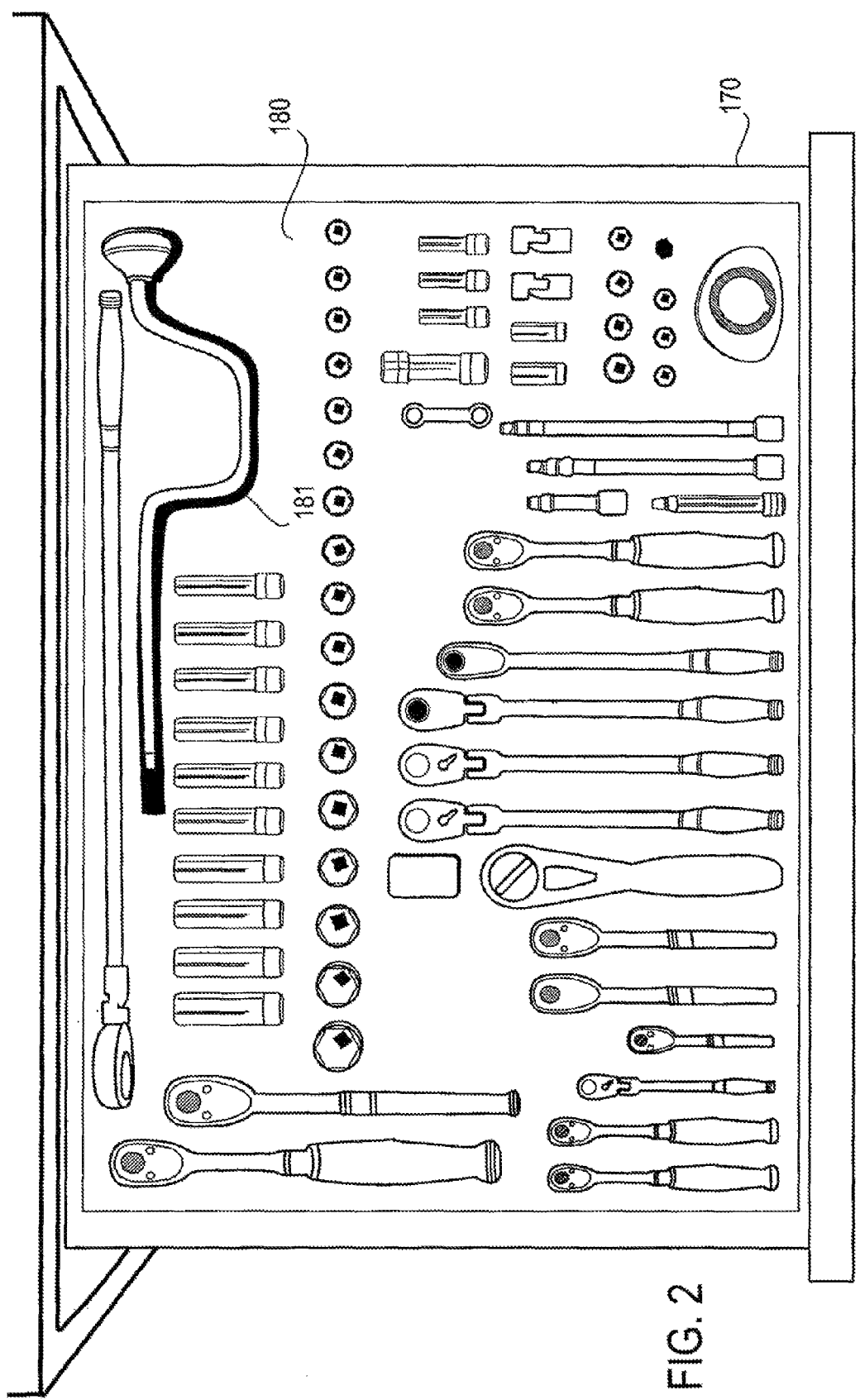
FIG. 2 shows details inside an exemplary storage drawer operated in the open mode.

FIG. 2 shows details inside an exemplary storage drawer 120 in the open mode. Each storage drawer 120 includes a foam base 180 having a plurality of storage locations, such as tool cutouts 181, for storing tools. Each cutout is specifically contoured and shaped for fittingly receiving a tool with corresponding shapes. Tools may be secured in each storage location by using hooks, Velcro, latches, pressures from the foam, etc.

An exemplary inventory control system according to this disclosure determines an inventory condition of objects by capturing and processing images of storage locations that are used to store the objects. The system includes various subsystems needed for performing different functions, including: a storage subsystem, an imaging subsystem, an access control subsystem, a power supply subsystem, a user interface subsystem, a data processing subsystem, a sensor subsystem, and a network subsystem. It is understood that the list of subsystems is for illustration purpose only and is not exhaustive. An exemplary system according to this disclosure may be implemented using more or less subsystems depending on design preference. Furthermore, not all the subsystems have to be integral part of the inventory control system. In one embodiment, various functions described in this disclosure may be implemented on a distributed architecture including multiple subsystems connected to a data transmission network. Each sub-system connected by the data transmission network contributes a portion of the functionality for the entire system. In this way, the total system functionality is distributed across multiple sub-systems that communicate via the data transmission network. A communications methodology or combination of methodologies can be established to allow seamless information sharing across the network to the various sub-systems or data processing systems external to the inventory control system. The methodology may include Transmission Control Protocol/Internet Protocol (TCP/IP), DISCO, SOAP, XML, DCOM, CORBA, HTML, ASP, Microsoft .NET protocols, Microsoft .NET Web Services and other alternate communications methodologies.

(1) Storage Subsystem

The storage subsystem includes multiple storage locations for storing objects, such as those illustrated in FIGS. 1a, 1b and 2. It is understood that other types of storage systems that are used for storing objects may be used to implement the storage subsystem.

(2) Imaging Subsystem

The image subsystem includes one or more image sensing devices configured to capture images of part or all contents or storage locations, and illumination devices providing needed illuminations. The image sensing device may be lens-based cameras, CCD cameras, CMOS cameras, video cameras, or any types of device that captures images. The image sensing devices may optionally include a preprocessing means for preprocessing captured image. Examples of the preprocessing include data compression, enhancement, information retrieval, data mining, deriving features of item of interest in certain pre-defined areas or regions of interest and the surrounding areas, etc. The image sensing devices convey raw image data or any preprocessed data for processing or viewing by a data processing system located locally or remote to the image subsystem. The camera may include a network interface for connecting to a data transmission network for transmitting data including the captured images, preprocessed images, information derived from the captured images, etc.

(3) Access Control Subsystem

The access control sub-system includes one or more identity verification devices for verifying or authenticating identity and an authorization level of a user intending to access objects stored in the storage subsystem; and one or more locking devices controlling access to the storage locations in the storage subsystem. For example, the access control subsystem keeps some or all storage drawers locked in a closed position until the identity verification device authenticates a user's authorization for accessing the storage subsystem.

The access control subsystem may use one or more access authentication means to verify a user's authorization levels, such as by using a key pad to enter an access code or passwords, a keycard reader to read from a key card or fobs authorization level of a user holding the card or fob, biometric methods such as fingerprint readers or retinal scans, facial recognitions, magnetic or radio frequency ID cards, proximity sensor, occupancy sensor, and/or manual entry or other methods. In one embodiment, access to each storage location or storage drawer is controlled and granted independently. Based on an assigned authorization or access level, a user may be granted access to one or more drawers, but not to others.

(4) Power Supply Subsystem

The power supply subsystem provides and manages power supplied to inventory access control system. The power supply subsystem includes one or more power sources including connections to one or more AC power sources and/or one or more power storage devices, such as batteries, and/or battery chargers. The subsystem may also include needed circuits and controllers for tracking a power supply condition of the system, such as switching between AC power supply and battery power supply, monitoring a charge state of the battery or batteries, etc. An external charger may be provided so that batteries may be charged apart from the system and kept in reserve for quick swap out of spent batteries on the system. In one embodiment, a remote battery charger may be connected to a data network coupled to the inventory control system to report a charge condition of a battery being charged at a remote charger. In another embodiment, the power supply subsystem is coupled to a master computer remote to the inventory control system, providing information regarding a power supply condition of the inventory control system to the master computer, such as power failures, charging conditions, available power supplies, etc.

(5) User Interface Subsystem

The user interface subsystem includes devices for communicating with a user of the inventory control system, such as one or more of a display, a microphone, a speaker, a keyboard, a mouse, or any other devices that output information to the user and/or allow the user to input information. The user may be a technician who intends to access objects or tools in the inventory control system, or a manager that manages the inventory condition of the system.

(6) Data Processing Subsystem

The data processing subsystem, such as a computer, is in charge of processing images captured by image sensing devices of the imaging subsystem and/or generating reports of inventory conditions. Images captured or formed by the image sensing devices are processed by the data processing system for determining an inventory condition. The term inventory condition as used throughout this disclosure means information relating to an existence or non-existence condition of objects.

The data processing subsystem may be implemented as an integral part of the inventory control system; or with a remote computer having a data link, such as a wired or wireless link, coupled to the inventory control system; or a combination of a computer integrated in the inventory control system and a computer remote to the inventory control system. Detailed operations for forming images and determining inventory conditions will be discussed shortly.

In one embodiment, the data processing subsystem holds user and/or object information and history. A user may query the data processing subsystem for status, setting up users, handling exceptions, system maintenance, and so on. In another embodiment, a host system, external to the inventory control system, is provided and coupled to the computer integral to the inventory control system via a data link or network, for providing supervisory or maintenance functions, viewing audit images, providing reports and summaries of item status and location, etc.

(7) Sensor Subsystem

Depending on needed functions, a sensor sub-system may be provided, in addition to the imaging subsystem, to sense attributes of objects or areas of interest or their surroundings. These attributes may be used in conjunction with image information obtained by the image sensing devices of the imaging subsystem to enhance the recognition of objects or states thereof. The sensor subsystem may include sensors for sensing conditions such as pressure, light, force, strain, magnetic field, capacitive sense, RFID, electric field, motion, acceleration, orientation, position, location, GPS, Radio Frequency triangulation, light triangulation, proximity, gravitational field strength and/or direction, touch and simple manual entry or interaction may be included as input.

(8) Network Subsystem

The network subsystem allows the subsystems to form data communications between the subsystems and/or to interface with a data communication network and/or another data processing system external to the inventory control system, for performing data communications. Examples of devices for implementing the network interface include one or more of an Ethernet interface, RS-232, RS-422, RS-485, Access bus, I2C, IE Bus, LIN Bus, MI Bus, Microwire bus, MOST, MPI Bus, SMBus, SPI (Serial Peripheral Interface), USB, WiFi or other wireless Ethernet, optical fiber, Zigbee, IEEE 802.15.4, Rubee, Bluetooth, UWB (Ultra-Wideband), IrDA, or any other suitable narrowband or broadband data communications technology. A combination of various communications interfaces can be used within and/or external to the inventory control system.

According to one embodiment, an operation cycle is as follows: the access control subsystem accepts user identification information. The data processing subsystem validates the user and sends a command via Ethernet and TCP/IP to activate image sensing devices, adjust illuminations for use by the imaging subsystem and unlock locks. The image sensing devices acquire images of the storage locations, and stitch the captured images together for evaluation of regions of interest related to objects. The imaging subsystem calculates attributes of the captured images and sends the attributes to the data processing subsystem over the Ethernet communications network for further evaluations. The data processing subsystem evaluates the attributes and determines an inventory condition, updates records in the inventory database and provides feedback to the user. Once the user signs off the system, the data processing subsystem sends a command via the Ethernet communications network to end the session, secure the drawers, and turn off illuminations and image sensing devices in the imaging subsystem.

Figure 3:
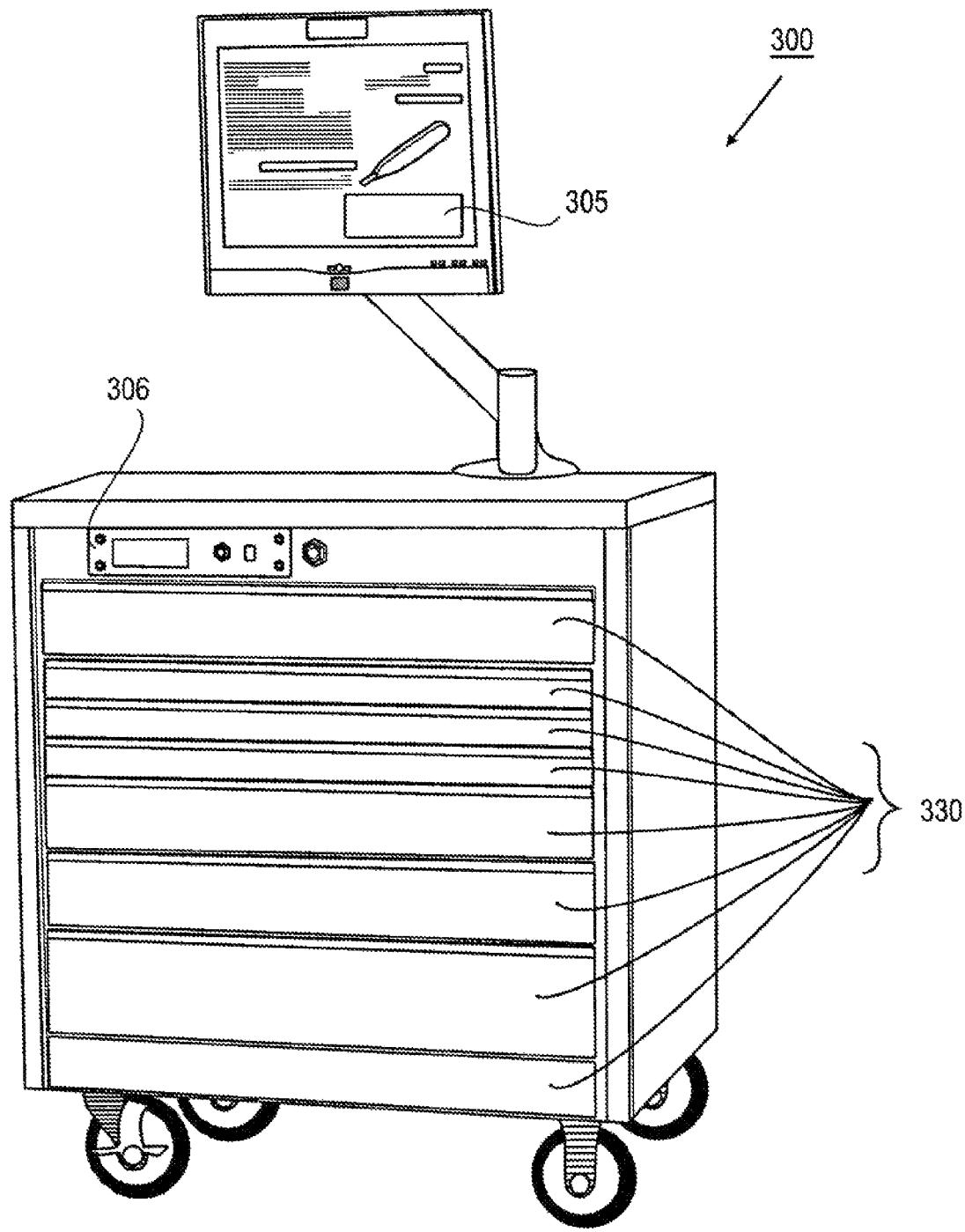
FIG. 3 shows an exemplary tool storage system according to this disclosure.

FIG. 3 shows an exemplary inventory control system implemented as a tool storage system 300 according to this disclosure for storing tools. Storage system 300 includes a display 305, an access control device 306, such as a card reader, for verifying identity and authorization levels of a user intending to access storage system 300, multiple tool storage drawers 330 for storing tools. Tool storage system 300 includes an image sensing device configured to capture images of contents or storage locations of the system. The image sensing device may be lens-based cameras, CCD cameras, CMOS cameras, video cameras, or any types of device that captures images.

System 300 includes a data processing system, such as a computer, for processing images captured by the image sensing device. Images captured or formed by the image sensing device are processed by the data processing system for determining an inventory condition of the system or each storage drawer. The term inventory condition as used throughout this disclosure means information relating to an existence or non-existence condition of objects in the storage system.

The data processing system may be part of tool storage system 300; a remote computer having a data link, such as a wired or wireless link, coupled to tool storage system 300; or a combination of a computer integrated in storage system 300 and a computer remote to storage system 300. Detailed operations for forming images and determining inventory conditions will be discussed shortly.

Drawers 330 are similar to those drawers 120 shown in FIG. 1a. Display 305 is an input and/or output device of storage system 330, configured to display information to a user. Information entry may be performed via various types of input devices, such as keyboards, mice, voice recognitions, touch panel entries, etc. Access control device 306 is used to limit or allow access to tool storage drawers 330. Access control device 306, through the use of one or more locking devices, keeps some or all storage drawers 330 locked in a closed position until access control device 306 authenticates a user's authorization for accessing storage system 300.

Access control device 306 may use one or more access authentication means to verify a user's authorization levels, such as by using a key pad to enter an access code, a keycard reader to read from a key card or fob authorization level of a user holding the card or fob, biometric methods such as fingerprint readers or retinal scans, or other methods. If access control device 306 determines that a user is authorized to access storage system 300, it unlocks some or all storage drawers 330, depending on the user's authorization level, allowing the user to remove or replace tools. In one embodiment, access to each storage drawer 300 is controlled and granted independently. Based on an assigned authorization or access level, a user may be granted access to one or more drawers of system 300, but not to other drawers. In one embodiment, access control device 306 relocks a storage drawer 330 after a user closes the drawer.

The location of access control device 306 is not limited to the front of storage system 300. It could be disposed on the top of the system or on a side surface of the system. In one embodiment, access control device 306 is integrated with display 305. User information for authentication purpose may be input through display device with touch screen functions, face detection cameras, fingerprint readers, retinal scanners or any other types of devices used for verifying a user's authorization to access storage system 300.

Figure 4A:
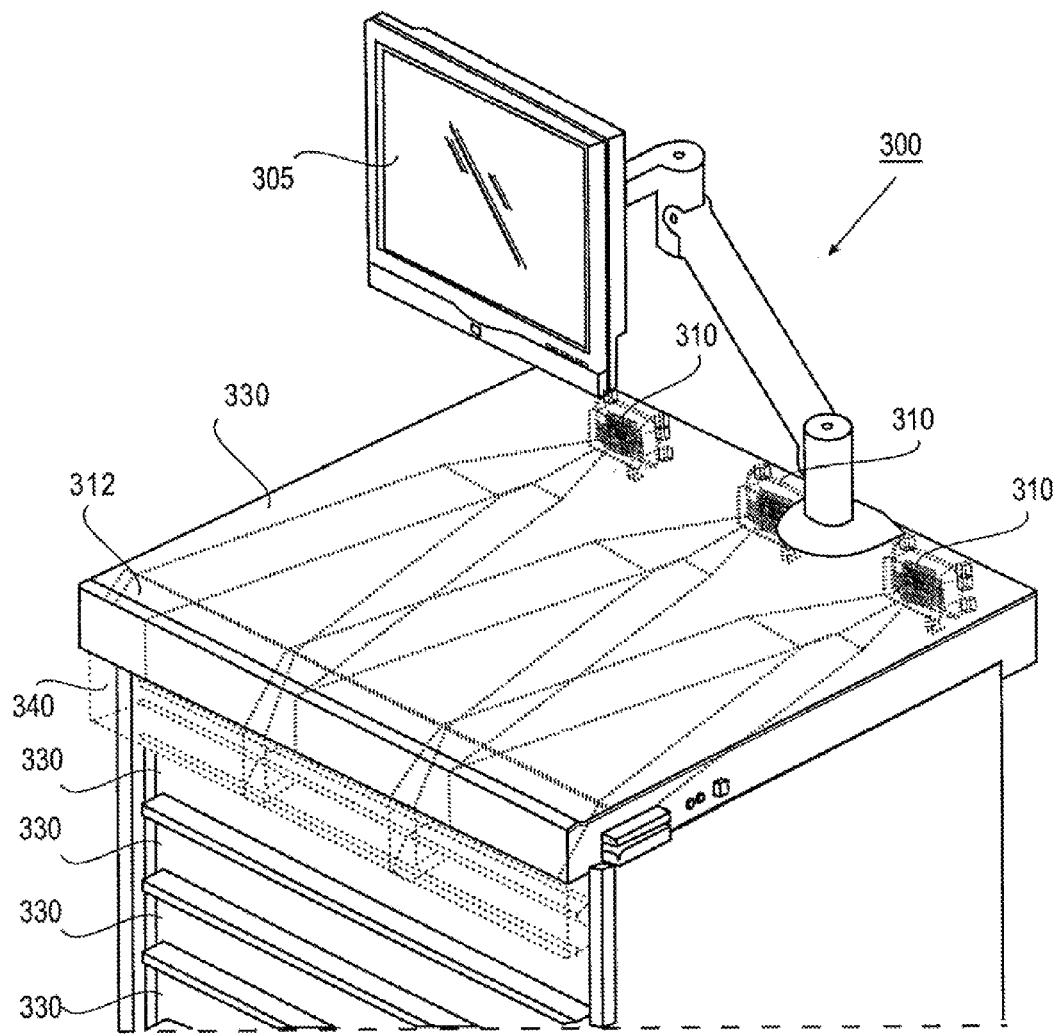
FIGS. 4a-4c and 4e are different views of the tool storage system shown in FIG. 3.
Figure 4B:
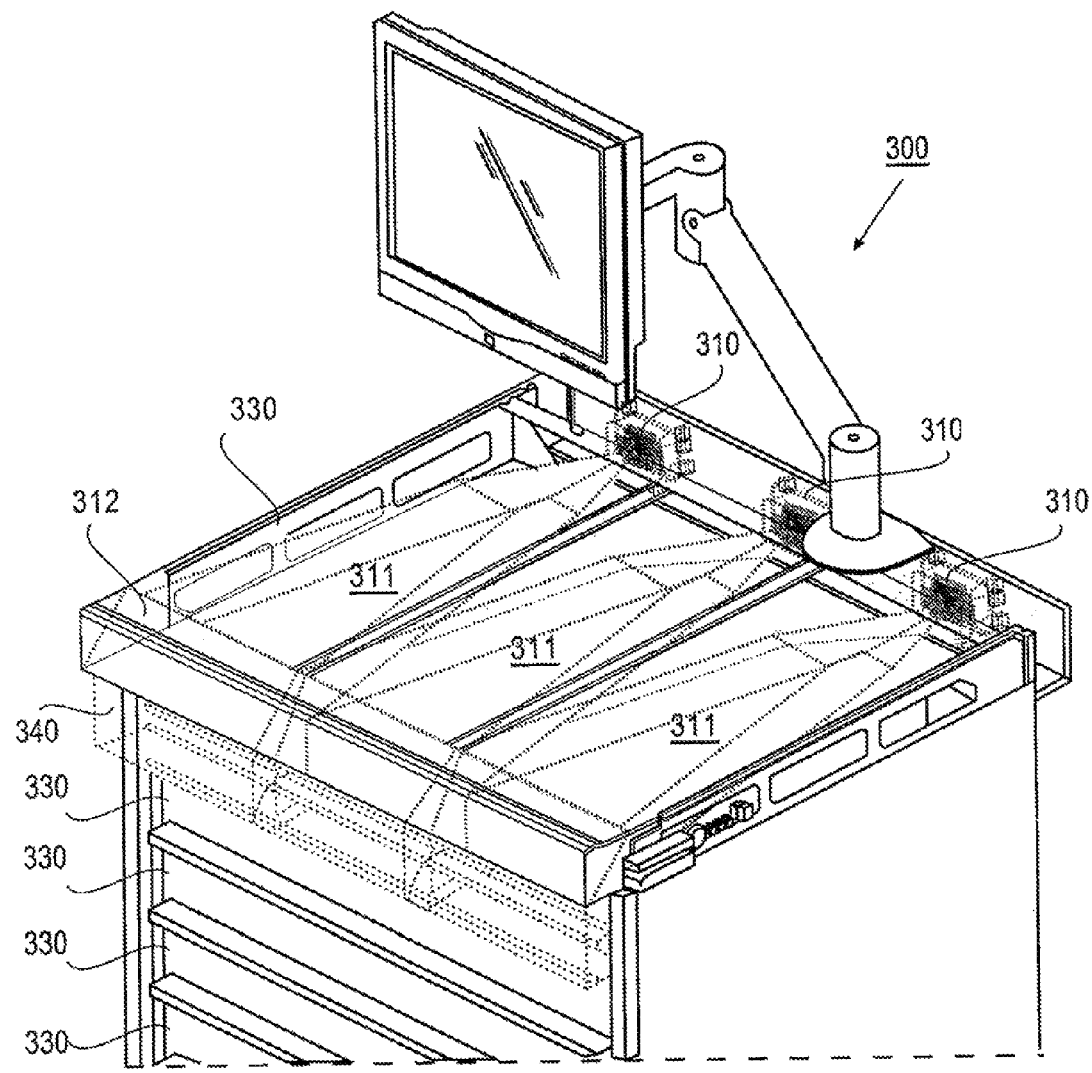

FIGS. 4a and 4b show a partial perspective view of an imaging subsystem in tool storage system 300. As illustrated in FIG. 4a, an access control device 306 in the form of a card reader is disposed on a side surface of the system. Storage system 300 includes an imaging compartment 330 which houses an image sensing device comprising three cameras 310 and a light directing device, such as a mirror 312 having a reflection surface disposed at about 45 degrees downwardly relative to a vertical surface, for directing light reflected from drawers 330 to cameras 310. The directed light, after arriving at cameras 310, allows cameras 310 to form images of drawers 330. The shaded area 340 below mirror 312 represents a viewing field of the imaging sensing device of tool storage system 300. Mirror 312 has a width equal to or larger than that of each storage drawer, and redirects the camera view downwards toward the drawers. FIG. 4e is an illustrative side view of system 300 showing the relative position between cameras 310, mirror 312 and drawers 330. Light L reflected from any of drawers 330 to mirror 312 is directed to cameras 310.

FIG. 4b is a perspective view identical to FIG. 4a except that a cover of imaging compartment 330 is removed to reveal details of the design. Each camera 310 is associated with a viewing field 311. As shown in FIG. 4b, the combined viewing fields of cameras 310 form the viewing field 340 of the image sensing device. Viewing field 340 has a depth of x. For instance, the depth of viewing field 340 may be approximately 2 inches.

Figure 4C:
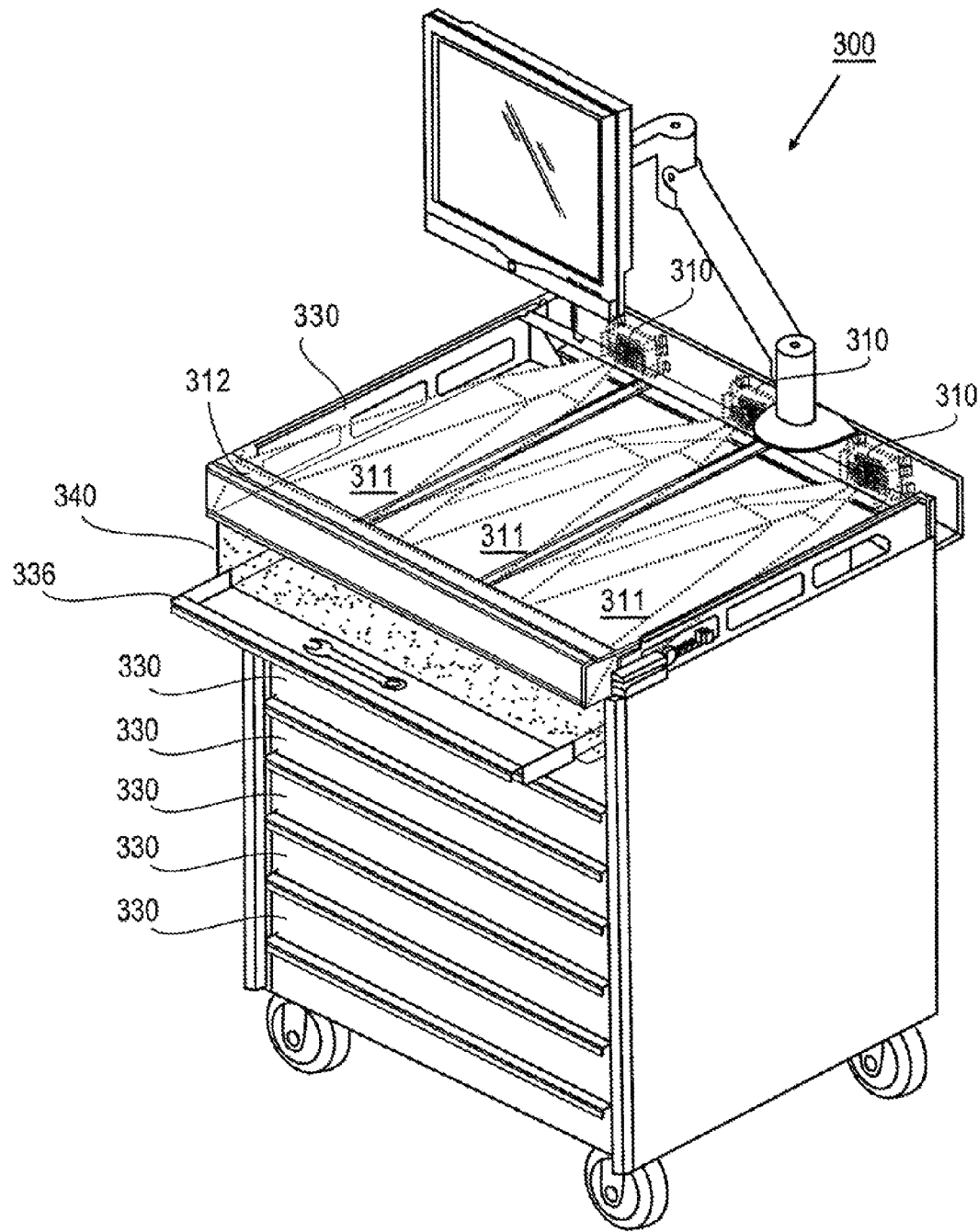

FIG. 4c is an alternative perspective view of tool storage system 300 shown in FIG. 4a, except that a storage drawer 336 now operates in an open mode allowing partial access to its contents or storage locations in storage drawer 336.

This arrangement of cameras 310 and mirror 312 in FIGS. 4a-4c allows cameras 310 the capability of capturing images from the top drawer to the bottom drawer, without the need to substantially change its focal length.

Figure 4D:
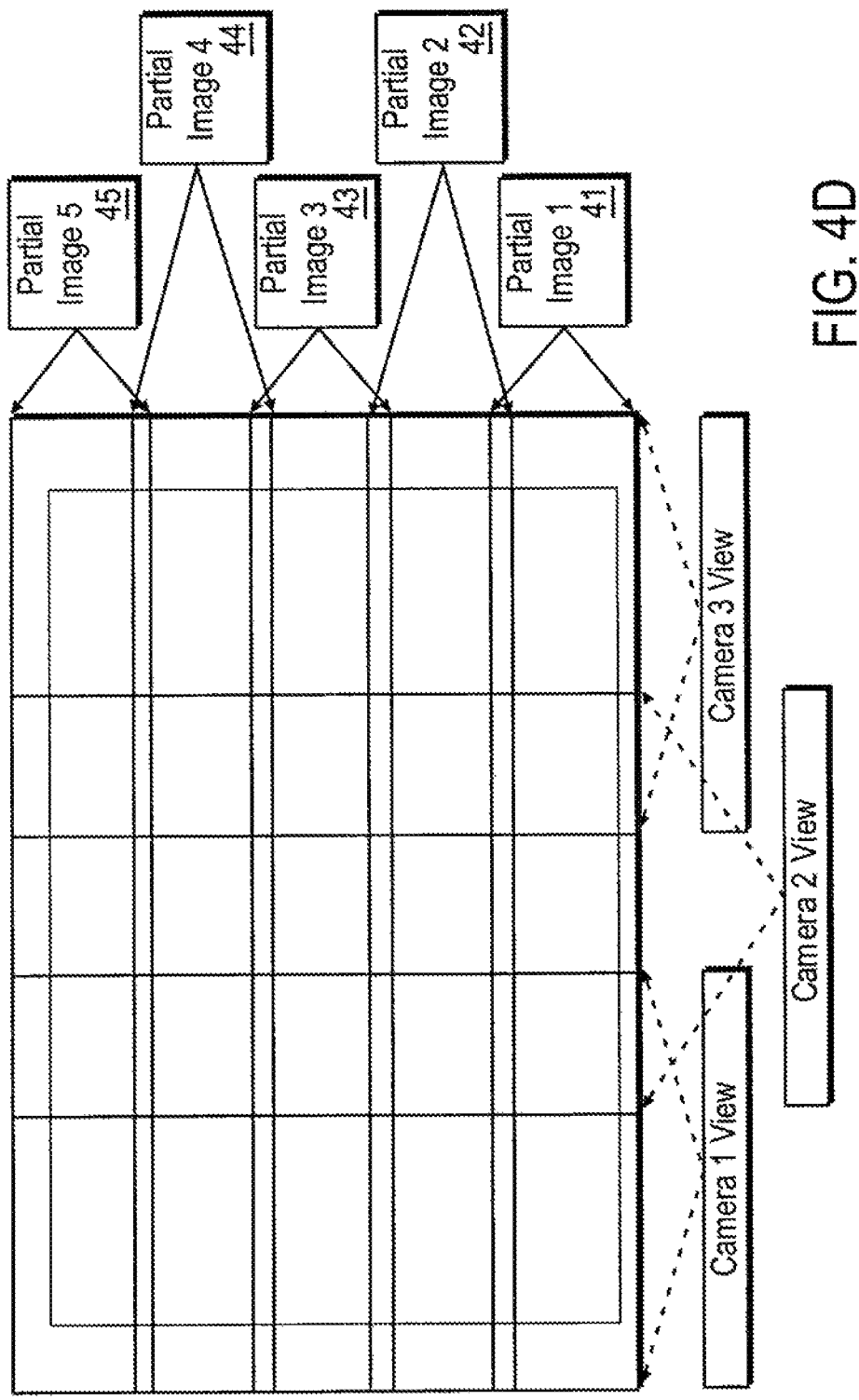
FIG. 4d illustrates how an exemplary image is stitched together.
Figure 4E:
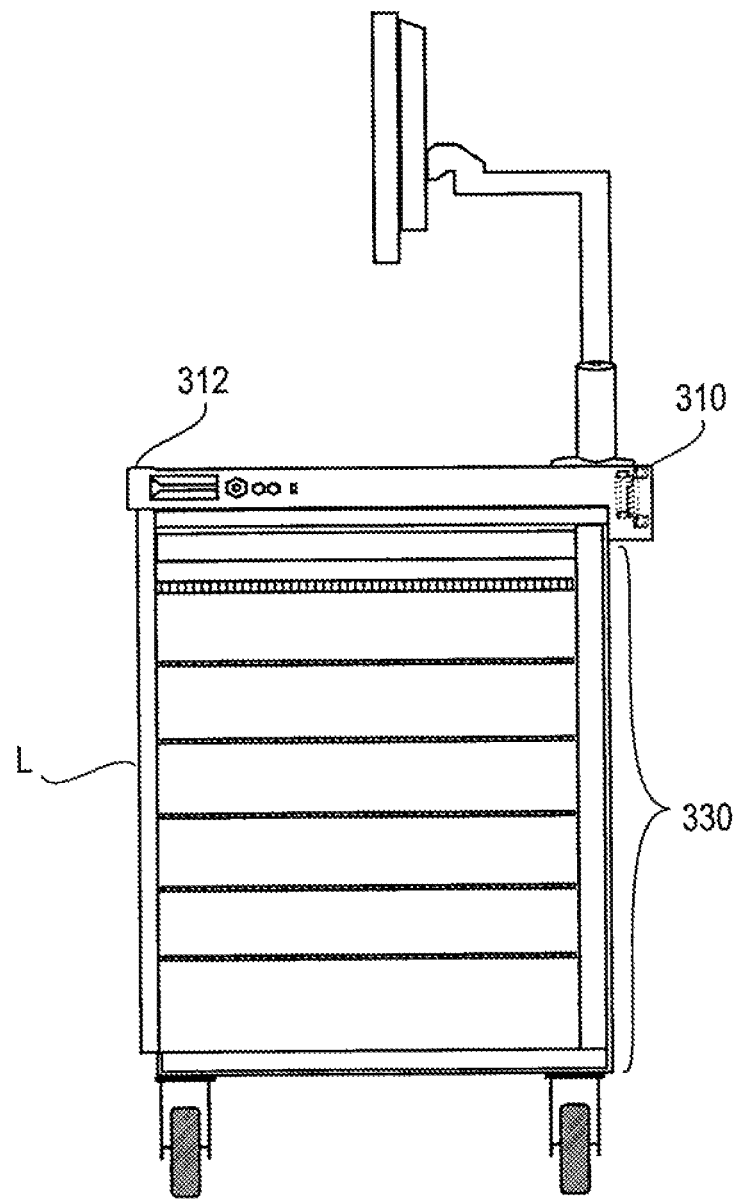

In one embodiment, cameras 310 capture multiple partial images of each storage drawer as it is opened or closed. Each image captured by cameras 310 may be associated with a unique ID or a time stamp indicating the time when the image was captured. Acquisition of the images is controlled by a data processor in tool storage system 300. In one embodiment, the captured images are the full width of the drawer but only approximately 2 inches in depth. The captured images overlap somewhat in depth and/or in width. As shown in FIG. 4D, the partial images 41-45 taken by different cameras 310 at different points in time may be stitched together to form a single image of the partial or entire drawer and its contents and/or storage locations. This stitching may be performed by the data processor or by an attached or remote computer using off-the-shelf or custom developed software programs. Since images are captured in approximately two inch slices multiple image slices are captured by each camera. One or more visible scales may be included in each drawer. The processor may monitor the portion of the image that contains the scale in a fast imaging mode similar to video monitoring. When the scale reaches a specified or calculated position, the data processing system controls the image sensing device to capture and record an image slice. The scale may also assist in photo stitching. Additionally a pattern such as a grid may be applied to the surface the drawer. The pattern could be used to assist the stitching or image capture process.

In another embodiment, the image sensing device includes larger mirrors and cameras with wide angle lens, in order to create a deeper view field x, such that the need for image stitching can be reduced or entirely eliminated.

In one embodiment, one or more line scan cameras are used to implement the image sensing device. A line scan camera captures an image in essentially one dimension. The image will have a significant width depending on the sensor, but the depth is only one pixel. A line scan camera captures an image stripe the width of the tool drawer but only one pixel deep. Every time drawer 330 moves by a predetermined increment the camera will capture another image stripe. In this case the image stripes must be stitched together to create a usable full drawer image. This is the same process used in many copy machines to capture an image of the document. The document moves across a line scan camera and the multiple image stripes are stitched together to create an image of the entire document.

In addition to a mirror, it is understood that other devices, such as prisms, a combination of different types of lens including flat, concave, and/or convex, fiber optics, or any devices may direct light from one point to another may be used to implement the light directing device for directing light coming from an object to a remote camera. Another option could be the use of fiber optics. The use of a light directing device may introduce distortions into the captured images. Calibrations or image processing may be performed to eliminate the distortions. For instance, cameras 310 may first view a known simple grid pattern reflected by the light directing device and create a distortion map for use by the data process processor to adjust the captured image to compensate for mirror distortion.

For better image capture and processing, it may be desirable to calibrate the cameras. The cameras may include certain build variations with respect to image distortion or focal length. The cameras can be calibrated to reduce distortion in a manner similar to how the mirror distortion can be reduced. In fact, the mirror calibration could compensate for both camera and mirror distortion, and it may be the only distortion correction used. Further, each individual camera may be calibrated using a special fixture to determine the actual focal length of its lens, and software can be used to compensate for the differences from camera to camera in a single system.

In one embodiment, the image sensing device does not include any mirror. Rather, one or more cameras are disposed at the location where mirror 312 was disposed. In this case, the cameras point directly down at storage drawers 330. In another embodiment, each storage drawer 330 has one or more associated cameras for capturing images for that storage drawer.

Determination of Inventory Conditions

In an exemplary system 300, each storage location in drawer 330 is configured to store a pre-designated object, such as a pre-designated tool. For instance, as shown in FIG. 2, each drawer 330 includes a foam layer 180 having a plurality of tool cutouts 181 for storing pre-designated tools. Each tool cutout has a shape substantially similar to the outline of tool stored in the cutout. System 300 determines the existence or absence of each object based on image data of one or more pre-defined regions of interest (ROI). A region of interest (ROI) is a pre-defined area whose image data includes useful information in determining the existence or absence of an object at a specific storage location. An ROI may be defined by system designers and may cover or overlap part of or the entire tool cutout, or does not cover or overlap a tool cutout at all. System 300 determines an inventory of objects or tools by analyzing image data of the pre-defined ROIs. Details for using ROIs for determining an inventory condition will be discussed shortly.

In order to improve the efficiency in image data processing and transmissions, system 300 determines the presence or absence of tools in drawers 330 based on image signatures derived based on captured images of one or more ROIs and reference image signatures of the ROIs. An image signature is a representation of a specific image or ROI including attributes unique to each image or ROI. These unique attributes include one or more of color, size, shape, width, height, depth, silhouette or profile, specific gravity, weight, diameter, reflectivity, density, thermal properties, viscosity, dimensions, texture, surface finish, etc. Representations of these attributes, according to one embodiment, are derived based on one or more captured images of an area. Details of deriving image signatures for a specific image or ROI will be described shortly.

System 300 has access to signature reference data which includes reference image signatures of the same area or ROI when an object, such as a tool, is present, and when the object is missing. For each area or ROI, a reference image signature may be generated by taking an image of that area or ROI both when an object is present and not present.

Based on a correlation of image signatures for an image of an area or ROI and the signature reference data, system 300 determines whether an object corresponding to a storage location is present or missing. For instance, two sets of reference image signatures are used—one related to a cutout being occupied by a corresponding tool, and one related to the same cutout not being occupied by the corresponding tool. A determination of an inventory condition is made based on a correlation of image signatures of a captured image of an area of covering the cutout and an area immediately surrounding the cutout, and signature reference data of the same area.

Suitable software may be executed by one or more data processors in system 300 or an attached computer for performing inventory determinations based on captured images. A non-volatile memory device of system 300 stores information identifying a relationship between each known storage location in the drawer and its corresponding pre-designated object. The memory device also stores pre-defined ROIs corresponding to each tool and reference image signature information in connection with the ROIs or the tools. One or more data processors determines which storage locations in a drawer are occupied by their corresponding pre-designated tool and which storage locations in the drawer are not occupied by their corresponding pre-designated tools. Identities of one or more existing and/or missing tools are determined based on the stored relationship identifying each storage locations and their corresponding pre-designated objects. The system also determines whether a tool is out of place or the wrong tool is in the storage location.

Details of image recognition and inventory determination are now described.

An exemplary tool storage system according to this invention utilizes a unique approach to perform image recognition, which dramatically reduces the amount of needed data and requires scientifically less computing power and time to perform needed calculations.

(1) Creation of Reference Data

As discussed earlier, exemplary system 300 determines an inventory condition of tools based on signatures derived based on captured images and reference image signatures of tools and tool cutouts. This disclosure proposes an efficient and unique approach in generating files of the reference image signatures.

In order to properly effectively and efficiently process images captured by cameras, system 300 needs to have access to information describing reference data including reference image signatures of pre-defined ROIs in connection with each tool; and information including identities of tools, locations of the tools, cutout locations in each drawer, cutout profiles, definitions of tool silhouettes, definitions of finger cutouts, channels between tool silhouettes, definitions of positions of tools in each drawer relative to a known feature of the foam, tool descriptions, part numbers and any information that is useful in performing image recognition. The information is collectively referred to as reference data.

An exemplary system according to this disclosure generates reference data in a highly automated manner by using existing data files called cutout files. Cutout files are created during the manufacture of foam layers with tool profile cutouts for use in tool storage systems. These cutout files are typically in an industry standard format such as .dxf format, and include information of tool profile cutouts for each drawer and a relative position of each tool in the drawer. Cutout files used in the creation of the drawer foam layers also provide additional useful information including the drawer where each tool is being stored, part numbers of the tools, National Serial Numbers, manufacturer part numbers, tool serial numbers, tool descriptions, etc.

For example, a software program called True Fit by Snap-on Incorporated includes a database of tool silhouettes and data related each tool. When making foam layers 180 with tool cutouts 181 for use in tool storage systems, a foam layout technician creates a foam layout for each drawer 330 according to a master tool list which includes all the tools to be included in tool storage systems for a specific order or customer. The list may be created by sales representatives and/or customers. The True Fit program, when executed by a computer, generates cutout files including foam layouts for each drawer 330 based on the master tool list and pre-stored data regarding each tool in a database. The cutout file includes information of each cutout, such as shapes and sizes, list of tools, and positional information of each cutout in each drawer. In one embodiment, the positional information includes coordinate information of each cutout relative to a common coordinate system of each drawer. The technician then cuts foams according to the foam layout by using a 2D water jet cutter or 3D machining tool.

By adapting cutout files used in foam development, such as .dxf files, to reference data for use in image recognition, the tool storage system now has access to data relating to the exact position of each tool in each drawer, along with the shape of the cutouts and other useful information such as tool number, serial number etc. This process eliminates the requirement to manually enter each tool into the inventory of the tool storage system, and it also provides precise information about the location of each tool in each drawer and the associated data for each tool. Additional information derived from this process may include reference image signatures and other tool attributes, such as color, size, shape, area, centroid, area moment of inertia, radius of gyration, specific dimensions (such as wrench opening, socket diameter, screwdriver length, etc.). Therefore, when the reference data is loaded, attributes for each tool are also accessible by the tool storage system.

(2) Regions of Interest

In order to improve efficiency of data processing, for each captured drawer image, exemplary system 300, rather than processing the entire image, performs image recognition focusing on pre-defined regions of interest (ROI), which are subsets of the captured image and hence include far less data required for processing. According to one embodiment, each tool has one or more pre-defined ROIs. As discussed earlier, an ROI may cover or overlap part of or the entire tool cutout 181, or does not cover or overlap tool cutout 181 at all.

Area of interests may be described by one or more of cutout locations in a coordinate system, cutout profiles, definitions of tool silhouettes, definitions of finger cutouts, channels between tool silhouettes, definitions of positions of tools in each drawer relative to a known feature of the foam, tool descriptions, part numbers and any information that is useful in performing image recognition.

(3) Training Process

A computerized training process is performed to adapt the cutout files into reference data useful by an exemplary tool storage system. Exemplary steps of the training process are described below:

a. Read Tool Information from Foam Cutout File

This step reads and loads a cutout file which contains tool data including tool positions, silhouettes, foam colors, background colors, attributes and other data.

This step also scales the image both horizontally or vertically to convert from the dimensional format used in the creation of the cutout file to pixels which are used in the camera and image based system. Typically there are about 8 to 10 pixels per point. A software conversion file with appropriate coding is used to make this conversion.

b. Create Tool Location Data Structure

ROI's are determined using the foam layout by processing areas related to shapes and positions of tool cutouts. A corner of the overall image is defined as an origin. A position of a bounding box within the image is then determined. The ROI is inside the bounding box and is determined by row and column number inside the bounding box. Any pixel within the bounding box that contains a portion of the ROI is detailed as ordered pairs with the top left corner of the bounding box as the origin. An exemplary data structure of ROI is provided below:

| | |
|---|---|
| Drawer.s1.d1 | // Drawer name |
| 96 | // resolution |
| Silhouette TMCO16 | // Part number |
| TOOL_BOX_ID 1051 | // Tool box id |
| DRAWER 01 | // Drawer No |
| POSITION S-0058 | // Position |
| DESCRIPTION Wrench, Crowfoot, Open End, ½" | // Description |
| ULC 1586 2379 | // Bounding box (Upper Left Corner) |
| LRC 1687 2499 | // Bounding box (Lower Right Corner) |
| 1 22 58 | // pixel data (Within the bounding |
| 1 21 60 | box by number of discreet |
| 2 20 62 95 20 | sections within the row, offset |
| 2 19 63 96 22 | and width (# pixels wide) |
| 2 19 64 95 20 | |
| 1 18 66 | |
| 1 17 68 | |
| 1 16 70 | |
| 1 16 70 | | c. Determine which Camera Processes the Tool

In an exemplary tool storage system that uses 4 cameras or six cameras for capturing drawer images, each camera has a 40 degree wide field of view (FOV), with 20 degrees of the FOV on either side of the center line of the image. The images from camera to camera can overlap. Depending on the position of the drawer, the overlap may be small as in the top drawer, or large, as in the bottom drawer where each camera can see the entire drawer. The tools and their associated ROI's are assigned to the cameras by determining the position of the centroid of each tool ROI and assigning the respective ROI to a camera having a FOV centerline closest to the ROI.

If an ROI expands into converges by more than one camera, the ROI is divided into pieces and assigned to individual cameras as outlined above.

d. Create Dilation Zone and Buffer Zone for Tools

In certain situations, a captured image related to a tool may deviate from the reference data, even when the tool is placed in its corresponding cutout or storage location. For instance, a tool may overhang the edge of the tool cutout, or may be pressed tightly into the foam causing the form to compress or deform, or the tool cutout may not be in the exact position which was expected. These situations, if not properly addressed, may cause a tool storage system to trigger false alarms.

Figure 5:
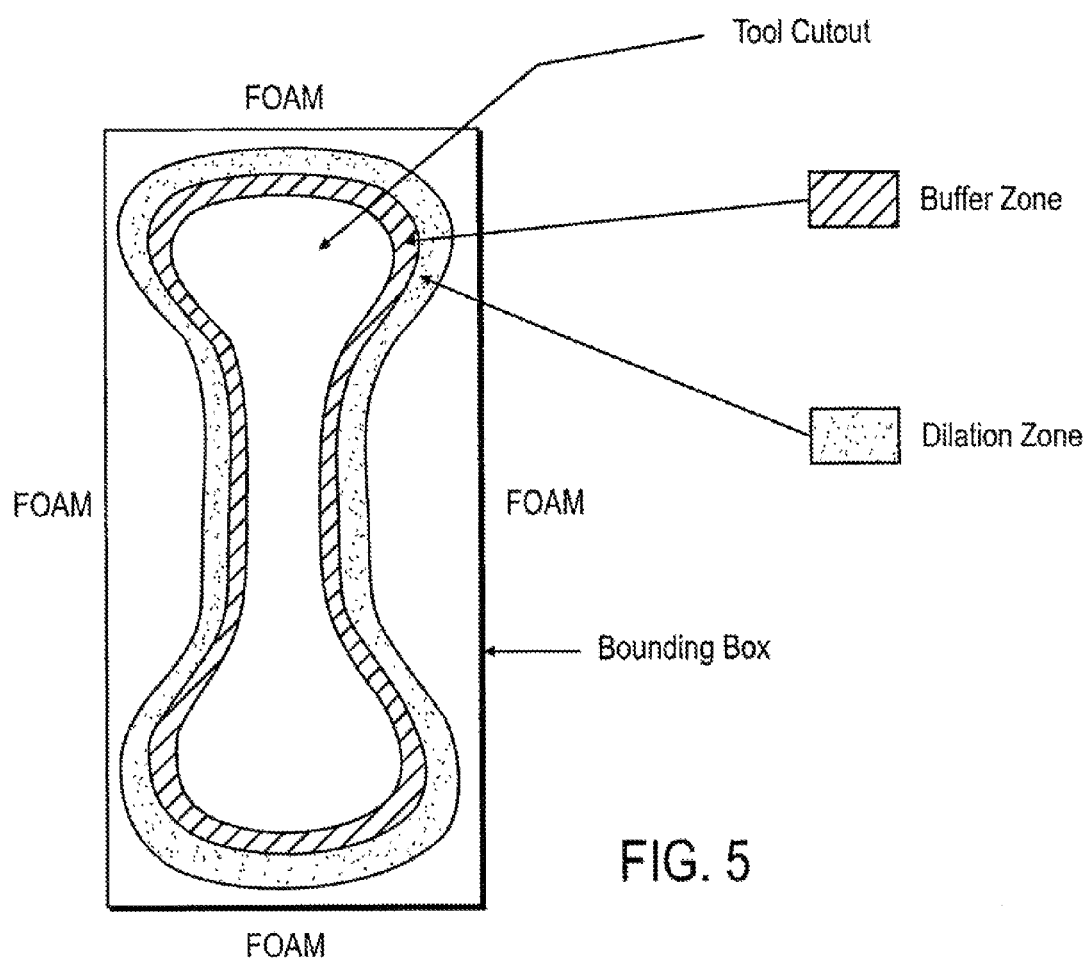
FIG. 5 shows exemplary tool cutout, buffer zone and dilation zone.
Figure 8A:
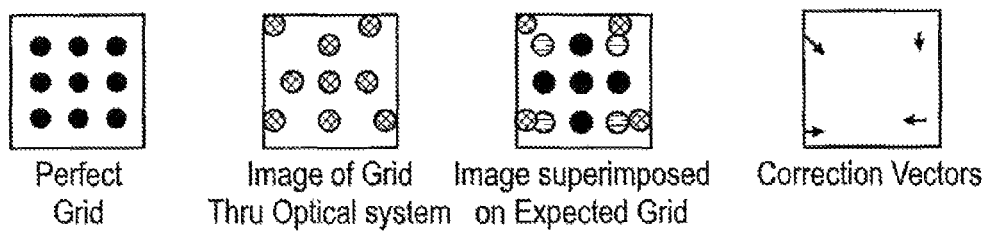
Figure 8B:
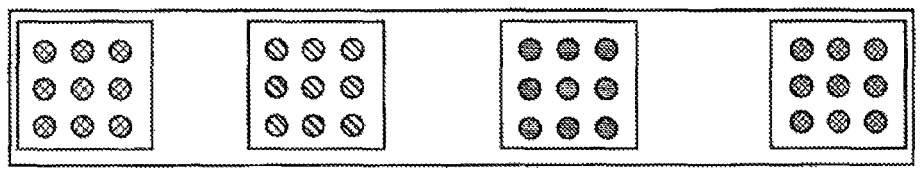
Figure 8C:
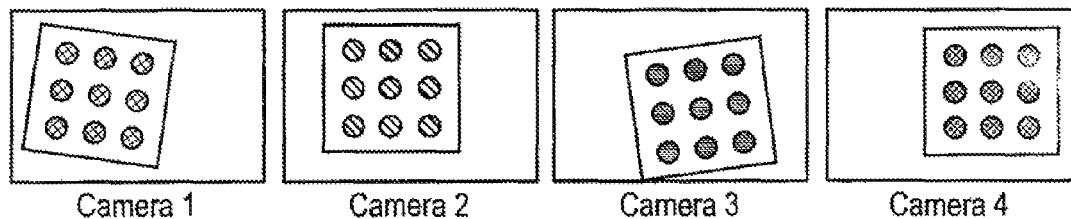
Figure 8D:
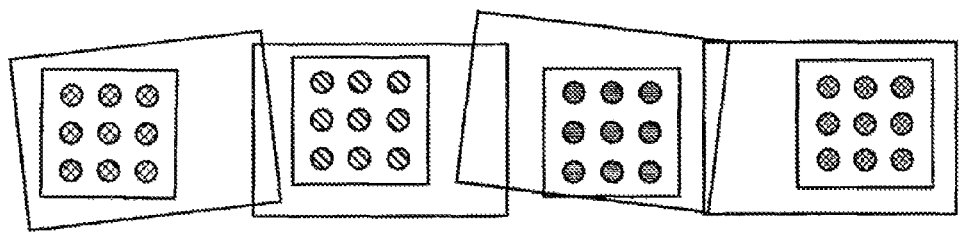

To address these issues, an exemplary system utilizes unique image data to evaluate an inventory condition of a tool. As shown in FIG. 5, a dilation zone and a buffer zone are assigned around each tool cutout. The buffer zone is an annular ring created around the tool cutout and includes an adjustable width, such a number of pixels. For example, a buffer zone for a tool cutout may be 5 pixels expanding away from the boundary of the tool cutout. The width is arbitrary and depends on system design. The dilation zone is an annular ring around the buffer zone and may be assigned an adjustable number of pixels. For example, the buffer zone may be expanded by 5 pixels away from the outer boundary of the buffer zone. The width is arbitrary and depends on system design.

In one embodiment, image data related to the buffer zone is ignored in the evaluation of the image, while image data related to the dilation zone is evaluated for attributes such as color, intensity, hue and saturation, etc. This data will be used later in evaluation of situations where something is laying over the edge of the tool cutout indicating a wrong tool has been placed in the storage location or cutout, or the right tool has been improperly placed in the storage location or cutout and is out of position, or there is something covering at least part of the buffer zone. A warning to the user and administrator will be issued when this occurs.

4. Image Recognition Based on Image Signatures

Each image includes attributes that represent unique characteristics of the image. These attributes include color, size, shape, width, height, depth, silhouette or profile, specific gravity, weight, diameter, reflectivity, density, thermal properties, viscosity, dimensions, texture, surface finish, etc. An exemplary system according to this invention utilizes a unique approach to extract information representative of each ROI from the captured image. This extracted information uniquely describes attributes of the ROI and is referred to as an image signature of the ROI.

As discussed earlier, a non-volatile storage device in system 300 stores data related to pre-defined ROI whose image data require processing by system 300. A pre-stored look-up table may be to identify each tool, its corresponding cutout information, and pre-selected ROIs whose image data are useful in determining an inventory condition of the tool. An inventory condition with respect to a tool is determined based on the image signature of each ROI associated with the tool which is derived based on the captured images and reference image signatures. Since only the image signature, not the raw image data, is used in determining an inventory condition, the efficiency in signal processing and data transmission is significantly improved.

The process for generating an image signature for an image is now described. One sample image signature using image hue and saturation is described. Other signatures that use various image attributes can be devised to which will can also be used to determine presence, absence, or identification of items in the inventory system.

An exemplary algorithm for the process is provided below: Conversion of RGB (red, green, blue) to IHS (intensity, hue, saturation)

$I=(r+g+b)/3$ if r, g and b are all equal, then h and s=0
else
Let:

$u=(2*r)-g-b$ $v=\text{sqrt}(3)*(g-b)$

Then:

$h=\arctan(v/u)$ if (h<0), add 1 to h, so 0<=h<=1

$s=\text{sqrt}(u^2+v^2)/(\text{Max saturation for this intensity and hue})$;

The relevant structures are:

```
typedef struct {
    BYTE hue;
    BYTE saturation;
    BYTE intensity;
    BYTE percent;
} PP_COLOR;
typedef struct {
    BOOL            partialRoi;
    PP_COLOR        myColors[5];
    PP_COLOR        foam[5];
} PP_SIGNATURE;
```

The exemplary system processes pixel data in ROI's corresponding to each tool cutout and its surrounding dilation zone. The RGB value of each pixel is converted to an IHS (intensity, hue, saturation) value. An exemplary system determines distribution characteristics of image attributes of the captured image. For example, a histogram describing a pixel number distribution with respective to various image attributes like intensity, hue and/or saturation values, is created.

In one embodiment, for image pixels with intensity values below and above pre-defined low and high thresholds (for example, 0.2 and 0.8, respectively), their hue and saturation are ignored as being unreliable and set to zero. These pixels are accumulated in two separate bins.

For pixels with intensity values between the threshold values, their intensity values are ignored because they too easily influenced by variable illumination intensity factors. For these pixels, the hue and saturation values are accumulated in the bins of a 2D (hue-saturation) histogram. Each bin represents a set of preset values of hue and saturation on the histogram.

The 2D histogram is then examined based on pixel number distributions to find the bin with the most pixels. Bins adjacent to the bin with the most pixels are included until the pixel count of a bin falls below a predefined fraction of the pixel count in the peak bin. For instance, the predefined fraction may be set as 0.5. The average intensity, hue and saturation of the selected bins is calculated and entered into the bytes of the PP_COLOR structure.

The percent member of the PP_COLOR structure is the percent of all the pixels in the ROI that were in this group of bins. The bins in this group are then ignored in any further processing, and the process is repeated to find the next such group of bins. This process is repeated until a predetermined number of bin groups are found.

The number of pixels in the two separate low and high intensity bins is also examined at each step, and these bins may account for one of the PP_COLOR structures in the PP_SIGNATURE structure.

In this manner, the structure of an image signature of ROI (PP_SIGNATURE) is filled in, with descriptive data for the five most populous pixel color groups. The PP_COLOR structure for the dilation zone around the tool in the PP_SIGNATURE structure is computed in like manner. The use of five colors for the signature is only an example and any number colors could be used for the signature.

Similar process is performed for the following baseline images:
Tool cutouts/No tool in ROI;
Tool cutouts/tool in ROI; and
Dilation zone.

Reference image signatures are acquired once, as part of a setup procedure. Reference signatures may be acquired for each tool cutout when the correct tool is known to be present, for each tool cutout when the tool is known to be absent, for the dilation zone when the correct tool is know to be present, and for the dilation zone when the tool is known to be absent. Then in normal operation the system acquires signature data for an ROI from a captured image and compares it to the tool-known-to-be-not-present data, the tool-known-to-be-present data. Reference image signatures can relate only to a particular tool and not to the drawer of tools. The reference image signatures can be generated independently for each tool and stored in a database. This generally done by capturing and images of a tool cutout with and without the tool in place. The image of just the tool and tool cutout is processed to extract the reference image signatures for all defined conditions of tool presence. The reference image signatures can be extracted from the database and incorporated in the inventory management system so that no reference image of the actual tool drawer is ever required. Further, the reference image signatures can be generated without ever capturing any images. Known parameters of the foam, tool cutout, and the associated tool such as colors and dimensions are manually or programmatically used to generate image attributes that define the reference image signatures for the tool cutout and tool.

An inventory condition related to an ROI is determined based on image signatures of the ROI's in the captured image and the reference image signatures.

If the image signature of a tool cutout ROI matches the reference image signature when the tool is not present within a preset percentage tolerance, then the tool is determined to be missing from the ROI and thus is issued or in use. One the other hand, if the image signature of a tool cutout ROI matches the reference image signature when the tool is present within a preset percentage tolerance, then the item is determined to be present in the ROI. The percentage tolerance used for determining tool presence or absence is adjustable. A suitable value may be selected empirically according to a design preference.

Examination of the image signature of the dilation zone ROI in comparison to reference image signatures corresponding to the dilation zone ROI can be used to determine conditions beyond just whether a tool is present or missing. For example, if a tool is not placed in its corresponding cutout correctly or the wrong tool is placed in the tool cutout, part of the tool may be outside of the cutout and in the dilation zone. Additionally an unexpected object such as a shop rag or extra tool could be placed in the drawer and be blocking part of a dilation zone of a tool cutout. The signature of the dilation zone ROI would not match its reference image signature, and the system would determine that an unknown condition exits in the storage compartment. In this case an alert could be generated to indicate the relevant storage location should be manually checked to correct the anomaly.

If the image signature of an ROI does not match either reference image signatures within a preset percentage tolerance, then an error or exception is determined to have taken place and an alert is given to the user and system administrator through the PC and GUI systems of the equipment. The error alert could be for wrong tool, misplaced tool, unknown item across multiple ROI's etc. In one embodiment the signature of the item in the tool cutout ROI could be compared to a database of all tools in the drawer, in the storage cabinet, or known globally. From this comparison the particular tool stored in the tool cutout can be determined and reported to the inventory system. In a broad sense this technique can be used to identify all of tools in a drawer without knowing which tools should be in the drawer or where there should be placed.

In one embodiment, each image signature is treated a vector. Similarity between the image signature of the ROI corresponding to the captured image and the reference image signature of the same item when the tool is known to be not present is calculated. For example, the similarity may be determined based on a distance between two vectors computed in know manners. Also, similarity between the image signature of the ROI corresponding to the captured image and the reference image signature of the same item when tool is known to be present is computed. A tool is determined to be not present if the similarity level between the image signature of the ROI corresponding to the captured image and the reference image signature of the same item when tool is known to be not present is higher than similarity level between the image signature of the ROI corresponding to the captured image and the reference image signature of the same item when tool is known to be present. Otherwise, the tool is determined to be present.

In another embodiment, each of the top most populous pixel groups in the image signature of the ROI corresponding to the captured image is compared with its counterpart of the reference image signature of the same item when tool is known to be not present, the reference image signature of the same item when tool is known to be present, respectively. A GOF (Goodness of Fit) value is determined from the signature matches and percentages. For example, the GOF value may be defined as an accumulation of min (percentage_of_captured_ROI, percentage_of_reference) corresponding to each entry in the signature. The accumulated percentage is then compared with a threshold value. If the GOF value with respect to the reference signature when tool is present is above the threshold value, it is determined that the tool is present. If the GOF value with respect to the reference signature when tool is not present is above the threshold value, it is determined that the tool is not present. If both the GOF values with respect to the reference signature when tool is present is above the threshold value and the reference signature when tool is not present are below the threshold value, it is categorized as a peculiar condition and a warning signal will be triggered or lodged. Such peculiar condition may be caused by an overhung tool, a deformed cutout, or wrong tool placed in the cutout.

Occasionally, a significant portion of a tool's attributes may match the attributes of the background and make detection of presence or absence more difficult. In these cases, the item can be split into multiple ROI's. The areas with ROI attributes matching the background will be ignored and only those areas with ROI attributes different from the attributes of the background will be evaluated.

A look-up table of image reference signatures corresponding to each inventory item may be created during a manufacture process and preloaded onto the tool storage system. At system setup, a complete database of reference image signatures can be loaded into each system along with the ROIs, part numbers and descriptions, and other data in the tool database.

Another feature of an exemplary tool storage system according this disclosure is automated item addition/deletion. This is a process whereby the system is configured to recognize new tools and add them to the database or remove tools that are no longer needed or useful from the database.

The same type of data files used to create the foam cutouts and reference data are used in the modification of existing drawer layouts to add or delete tools. The file is then loaded to the memory of the system and the foam is changed. The system automatically recognizes that there is a new tool(s) in (or removed from) the database and the specified storage location or cutout is now in place (or removed).

It has been determined that the precise location of an ROI corresponding to the image and its associated tool cutout in the foam may vary slightly from the position as calculated in the tool training and loading files. In order to compensate for this possible difference in actual and calculated positions, holes are provided in the foam layer as a position check. The hole positions are related to the position of the drawer tracking and positioning strips and provide verification of the actual positions of the ROI's and tool cutouts in the drawer foam.

Another embodiment according to this disclosure utilizes specially designed identifier for determining an inventory condition of objects. Depending on whether a storage location is being occupied by an object, an associated identifier appears in one of two different manners in an image captured by the image sensing device. For instance, an identifier may appear in a first color when the associated storage location is occupied by a tool and a second color when the associated storage location is unoccupied. The identifiers may be texts, one-dimensional or two-dimensional bard code, patterns, dots, code, symbols, figures, numbers, LEDs, lights, flags, etc., or any combinations thereof. The different manners that an identifier may appear in an image captured by the image sensing device include images with different patterns, intensities, forms, shapes, colors, etc. Based on how each identifier appears in a captured image, the data processor determines an inventory condition of the object.

FIG. 6a shows an embodiment of identifier designs. As shown FIG. 6a, storage location 511 is designated to store tool 510, and storage location 52 is currently occupied by its designated tool 520. Storage location 53 is not occupied by its designated tool. Each storage location 51, 52, 53 has an associated identifier. Depending on whether each storage location 51-53 is being occupied by a corresponding tool, each identifier appears in an image captured by cameras 310 in one of two different manners. For example, each identifier may not be viewable by cameras 310 when a corresponding tool is stored in the respective storage location, and becomes viewable by cameras 310 when an object is not stored in the respective storage location. Similarly, a different embodiment may have an identifier viewable by the image sensing device when an object is stored in the respective storage location, and is not viewable by the image sensing device when an object is not stored in the respective storage location.

For instance, the bottom of storage locations 51-53 includes an identifier made of retro-reflective material. Since storage locations 51 and 53 are not occupied by their respective designated tools, their associated identifiers 511 and 513 are viewable to the image sensing device. On the other hand, storage location 52 is currently occupied by its designated tool, and its identifier is blocked from the view of the image sensing device. When the particular tool is stored in the storage location, the identifier is blocked from the view of the image sensing device and not viewable by the image sensing device. On the other hand, if the storage location is not occupied by the particular tool, the identifier is viewable by the image sensing device and shows up as a high intensity area on an image of the drawer. Accordingly, a high intensity area represents a missing tool. The system 300 detects locations with missing tools and correlates the empty locations with stored relationship identifying each storage locations and their corresponding tools. The system 300 determines which tools are not in their specified locations in a drawer. It is understood that the identifiers may be implemented in many different manners. For instance, the identifiers may be designed to create a high intensity image when a storage location is occupied and an image with less intensity when the storage location is occupied.

In one embodiment, each identifier is implemented with a contact sensor and an LED. As shown in FIG. 6b, storage location 61 is associated with a contact sensor 62 and an LED 63. When contact sensor 61 senses a tool is in storage location 61, a signal is generated by contact sensor 61 and controls to turn off power supply to LED 63. On the other hand, if contact sensor 62 detects that a tool is not in storage location 61, control sensor 62 generates a control signal which controls to turn on LED 63, which creates a high intensity area in an image captured by the image sensing device. Each high intensity area in an image indicates a storage location without an associated tool. The system 300 identifies removed or missing tools by determining which storage locations are not occupied by tools and pre-stored information identifying corresponding tools of the locations. In still another embodiment, the identifier is unique to the pre-designated tool stored in each respective storage location. The data processor is configured to determine an inventory condition by evaluating whether at least one viewable identifier exists in an image of the storage locations captured by the image sensing device, and pre-stored relationship between each pre-designated object and a respective identifier unique to each pre-designated object.

In still another embodiment, an identifier associated with a storage location creates a high intensity image when the storage location is occupied, and a lower intensity image when the storage location is unoccupied. The system 300 determines which tools exist based on detected identifiers and pre-stored information identifying a relationship between each storage location and the corresponding pre-designated object. In another embodiment, the identifier is unique to a pre-designated object stored in each respective storage location. The system 300 determines an inventory condition of existing objects by evaluating identifiers that exist in an image of the storage locations captured by the image sensing device, and pre-stored relationship between each pre-designated object and a respective identifier unique to each pre-designated object.

In still another embodiment, each object stored in the system 300 includes an attached identifier unique to each object. The data processor has access to prestored information identifying each tool stored in the system and known information identifying a relationship between each object and a respective identifier unique to each pre-designated object. The data processor determines an inventory condition of objects by evaluating identifiers that exist in an image of the storage locations captured by the image sensing device, and the relationship between each pre-designated object and a respective identifier unique to each pre-designated object. For instance, system 300 stores a list of tools stored in the system and their corresponding unique identifiers. After cameras 310 captures an image of a storage drawer, the data processor determines which identifier or identifiers are in the image. By comparing the identifiers appearing in the image with list of tools and their corresponding unique identifiers, the data processor determines which tools are in the system and which ones are not.

As discussed earlier, identifiers associated with the storage locations may be used to determine which locations have missing objects. According to one embodiment, system 300 does not need to know the relationship between each storage location and the corresponding object. Rather, each identifier is unique to a corresponding object stored in the storage location. The data processor of system 300 has access to pre-stored information identifying a relationship between each identifier and the corresponding object, and information identifying each object. In other words, system 300 has access to an inventory list of every object stored in system 300 and its respective unique identifier. When an empty tool storage location is detected by system 300, the corresponding identifier is extracted from the image and decoded by system software. As each identifier is unique to a corresponding object, system 300 is able to determine which object is missing by checking the relationship between each identifier and the corresponding object, and the inventory list of objects. Each identifier unique to an object stored in a storage location may be disposed next to the storage location or in the storage location. In one embodiment, the identifier is disposed next to the storage location and is always viewable to the image sensing device no matter whether the location is occupied by an object or not. In another embodiment, when an identifier is disposed in the corresponding location, the identifier is not viewable to the image sensing device when the location is occupied by an object, and is viewable to the image sensing device when the location is not occupied by an object.

An embodiment of this disclosure utilizes combinations of baseline images and identifiers unique to objects to determine an inventory status. For example, a baseline image may include information of a storage drawer with all storage locations occupied with their respective corresponding objects, wherein each storage location is associated with an identifier unique to an object stored in the storage location. An inventory condition is determined by comparing an image of the storage locations and the baseline image, to determine which locations are occupied by objects and/or which locations have missing objects. Identifications of the missing objects are determined by identifying the identifier associated with each storage location with missing object.

Another embodiment of this disclosure utilizes unique combinations of identifiers to determine an inventory status. For instance, each storage location may have a first type of identifier disposed in the location and a second type of identifier unique to an object stored in the storage location and disposed next to the storage location. The first type of identifier is viewable to an image sensing device when the location is not occupied by an object and not viewable by an image sensing device when the location is occupied by an object. The first type of identifier may be made of retro-reflective material. If a storage location is not occupied by an object corresponding to the storage location, the identifier of the first type is viewable by the image sensing device and shows up as a high intensity area. Accordingly, each high intensity area represents a missing object, which allows system 300 to determine which locations having missing objects. Based on identifiers of the second type associated with those locations with missing objects, system 300 identifies which objects are missing from system 300. Consequently, an inventory condition of system 300 is determined.

According to still another embodiment, system 300 uses image recognition methods to identify an object missing from system 300. System 300 has access to an inventory list indicating which tools are stored in each drawer or system 300. However, system 300 does not have to know where the tools are stored. The tools are placed in foam cutout locations specific for each tool. Using characteristics such as size, shape, color, and other parameters image recognition software identifies each tool in the drawer. Missing tools are simply the tools on the inventory list that are not identified as being in the drawer.

System 300 records access information related to each access. The access information includes time, user information related to the access, duration, user images, images of storage locations, store unit or contents of the storage system, objects in the storage system, etc., or any combinations thereof. In one embodiment, system 300 includes a user camera that captures and stores image of the person accessing storage system 300 each time access is authorized. For each access by a user, system 300 determines an inventory condition and generates a report including associating the determined inventory condition with access information.

Timed Image Capturing

Embodiments of this disclosure utilize uniquely timed machine imaging to capture images of system 300 and determine an inventory condition of system 300 according to the captured images. In one embodiment, system 300 activates or times imaging of a storage drawer based on drawer locations and/or movements, in order to create efficient and effective images. For instance, a data processor of the system 300 uses drawer positions to determine when to take overlapping partial images as discussed relative to FIGS. 4a-4e, to assure full coverage of a drawer being accessed by a user. In another example, drawer position information may be useful to the stitching software in the construction of a full drawer image. Drawer position information may be used to help locate the positions of the cutouts in the drawer.

In one embodiment, the data processor of system 300 controls the image sensing device to form images of a drawer based on a pre-specified manner of movement by the drawer. For instance, for each access, system 300 only takes images of the drawer when it is moving in a specified manner or in a predetermined direction. According to one embodiment, the image sensing device takes images when a drawer is moving in a direction that allows decreasing access to its contents or after the drawer stops moving in the direction allowing decreasing access to its contents. For example, cameras may be controlled to take pictures of drawers when a user is closing a drawer, after a drawer stops moving in a closing direction or when the drawer is completely closed. In one embodiment, no images are taken when the drawer is moving in a direction allowing increasing access to its contents, such as when a drawer moves from a close position to an open position.

Locations, movements and moving directions of each storage drawer may be determined by using sensors to measure location or movement sensors relative to time. For instance, location information relative to two points in time may be used to derive a vector indicating a moving direction.

Examples of sensors for detecting a position, movement or moving direction of storage drawers include a sensor or encoder attached to a drawer to detect its position relative to the frame of system 300; a non-contact distance measuring sensor for determining drawer movement relative to some position on the frame of the system 300, such as the back of the system 300; etc. Non-contact sensors may include optical or ultrasonic sensors. A visible scale or indicator viewable by cameras 310 may be included in each drawer, such that camera 210 could read the scale to determine drawer position.

A change in an inventory condition, such as removal of tools, occurring in the current access may be determined by comparing inventory conditions of the current access and the access immediately before the current access. If one or more objects are missing, system 300 may generate a warning signal, such as audible or visual, to the user, generate a notice to a remote server coupled to system 300, etc.

In another embodiment, the image sensing device is configured to form images of the storage locations both when storage drawer 330 moves in a direction allowing increasing access to its contents, and when storage drawer 330 subsequently moves in a direction allowing decreasing access to its contents. For example, when a user opens drawer 330 to retrieve tools, the moving direction of drawer 330 triggers cameras 310 to capture images of drawer contents when it moves. The captured image may be designated as a "before access" image representing a status before a user has accessed the contents of each storage drawer. An inventory condition is determined based on the captured images. This inventory condition is considered as a "before access" inventory condition. Cameras 310 stop capturing images when drawer 330 stops moving. When the user closes drawer 330, the moving direction of drawer 330 triggers cameras 310 to capture images of drawers 330 again until it stops or reaches a close position. An inventory condition of the drawer is determined based on images captured when the user closes drawer 330. This determined inventory condition is designated as an "after access" inventory condition. A difference between the before access inventory condition and the after access inventory condition indicates a removal or replacement of tools. Other embodiments of this disclosure control cameras to take the "before access" image before a storage drawer is opened or after the storage drawer is fully opened or when its contents are accessible to a user. According to another embodiment, the image sensing device is timed to take an image of each drawer 330 when it was detected that access by a user is terminated. As used herein in this disclosure, terminated access is defined as a user no longer having access to any storage locations, such as when drawer 330 is closed or locked, when door 250 is closed or locked, etc., or an indication by the user or the system that access to the storage system is no longer desired, such as when a user signs off, when a predetermined period of time has elapsed after inactivity, when a locking device is locked by a user or by system 300, etc. For each access, a position detector or contact sensor is used to determine whether drawer 330 is closed. After the drawer is closed, the image sensing device captures an image of drawer 330. The data processing system then determines an inventory condition based on the captured image or images. A difference in the inventory condition may be determined by comparing the determined inventory condition of the current access to that of the previous access.

According to another embodiment, for each access, the image sensing system 300 is timed to capture at least two images of drawer 300: at least one image (initial image) captured before a user has access to storage locations in drawer 300 and at least one image captured after the access is terminated, as discussed earlier. The initial image may be taken at any time before the user has access to the contents or storage locations in the drawer. In one embodiment, the initial image is captured after a user requests access to system 300, such as by sliding a keycard, punching in password, inserting a key into a lock, providing authentication information, etc. In another embodiment, the initial image is captured before or in response to a detection of drawer movement from a close position or the unlocking of a locking device of system 300.

The data processing system of system 300 determines an inventory condition based on the initial image, and assigns the determined inventory condition as "before access" inventory condition; and determine an inventory condition based on the image captured after the access is terminated and designated the determined inventory condition as "after access" inventory condition. A change in the inventory condition of objects in system 300 may be determined based on a comparison of the "before access" and "after access" inventory conditions or a comparison of the initial image and the image captured after the access is terminated.

Concepts and designs described above may be applicable to other types of storage systems, such as a type shown in FIG. 1B, where a single door controls the access to multiple shelves or drawers. In one embodiment, the image sensing device may be timed to capture images of the storage locations after a detected termination of access, such as closing door 250, locking door 250, signing out, etc. It is understood that various types of sensors, such as contact sensors, infrared sensors, may be used to determine when a door is closed. Similar to the discussions earlier, the image sensing device captures images of the storage locations, and determine an "after access" inventory condition based on the captured image. A change in the inventory condition related to the access by comparing an inventory condition of the current access and that of the last access. According to another embodiment, the image sensing device is timed to take "before access" images of the storage locations before a user has access to the storage system. For instance, the cameras may be timed to capture images of the storage locations after a user requests access to the system, after detecting an opening of door 250, after receiving authentication information from a user, etc. The storage system determines a "before access" inventory condition based on the "before access" image. A change in the inventory condition may be determined according to a difference between the "before access" and "after access" inventory conditions, or a difference between the "before access" and "after access" images.

Image Calibration

As discussed earlier, multiple cameras may be used to capture partial images of a drawer. Such images are then stitched together to form a complete image of a drawer for further processing. Accordingly, for the purpose of stitching images, it is important to know the relative positional relationships between the partial images such that the partial images can be stitched or combined properly. Furthermore, processing of an image of an ROI may be performed based on a partial image as long as the entire ROI is within the partial image. Under such circumstance, it is important for a tool storage system to know locate the correct location of an ROI from a partial image, especially the partial image may be distorted, twisted or skewed during the capturing of the image.

An embodiment of this disclosure provides known, non-repeating reference patterns in each drawer. For example, as shown in FIG. 6a, a drawer is provided with two visible, non-repeating scales A, B, C . . . S on both sides of a drawer. Information of the relative positions of the scales in the drawer is known and stored in the system. At any given time when an image is captured, patterns of both scales must always appear in the captured image. Only one camera or multiple cameras can be used to capture the images. As the width of the drawer gets wider one can use a camera with a shorter focus length. However, such camera with a shorter focus length would reduce the resolution of the image. Alternatively, more than one camera separated or angled can be used to acquire the desired drawer width and resolution. It is possible to use one or more cameras dedicated to viewing the scale pattern, or to use the same camera that will view all or part of the drawer contents.

If, as shown in FIG. 6b, a partial image of the drawer shown in FIG. 6a is obtained, any ROI (region of interest) within the partial image shown in FIG. 6b may be determined by interpolation of known tool cutout reference position information within the known foam dimensions and images of the scale information. From the visible scale in FIG. 6b, it is easily recognized where the partial image is in the full drawer image shown in FIG. 6a. By knowing where the partial image is relative to the entire drawer, the partial image can be properly stitched together with other partial images.

Also, the ratio of a to b to c in the partial image shown in FIG. 6b is the same as the ratio x to y to z of the stored cutout file information as shown in FIG. 6a. With this known ratio, the location of any ROI corresponding to the partial image in FIG. 6b can be determined.

Furthermore, with two or more reference patterns or scales that can always be captured by the camera at any given time, even if the perspective of the image changes, using the relative positions of the reference patterns or scales in the captured image and the known relationships of the drawer, the distorted image may be rescaled, rotated or adjusted to convert the distorted image back to fit the known relationships. For example, if a distance between the two scales in FIG. 6b is reduced, the system is able to determine an expansion factor by calculating a ratio between a distance between the scales in the captured image and the known distance stored in the system. This expansion factor is then applied to the captured image to convert the image back to normal.

Furthermore, by knowing a position of each partial image relative to the entire drawer, a moving speed of a drawer can be determined. For example, as shown in FIG. 6c, two partial images 1 and 2 are captured. As discussed earlier, based on images of the scales, the system can determine where the partial image is relative to the entire drawer by referring to the reference data stored in the system. Since the positional information of partial images 1 and 2 is now known, a displacement (distance A) between partial image 1 and image 2 can be determined. The travel time t is the time between two captured images which can be obtained from the camera. Therefore, the travelling speed of the drawer is v=A/t.

The moving speed of the drawer may be used by the system to time the imaging of the drawer. From the speed measurement, the system may anticipate when the next image should be taken. For instance if the speed of the drawer is 5"/sec and cameras of the system have an image coverage of 2", then the system can determine that it will need to take the next image in ⅖ of a second to achieve no overlap of or gap between the images. ⅕ of a second would provide a 1" overlap between consecutive images. An acceleration of the travelling drawer can be determined by taking the derivative of the drawer speed and track the acceleration of the drawer to further anticipate when to take the next image. Based on the information of speed and acceleration, the system can conserve energy for battery operation, and/or to speed up the performance of the system by properly timing the imaging of the drawer without capturing unnecessary images.

If the drawer gets twisted, and/or moves away from the camera, the perspective image will be rotated and distorted (skewed) as shown in FIG. 6d. Such distortion may be detected based on a comparison of the captured images of the scales and the known positional relationship of the scales in the drawer. A correction of the distorted image may be obtained by adjusting or rotating the captured image to enable the captured scale image to correctly overlay on the correct position of the scales according to the stored reference data of the scales (see FIG. 6e). It is understood that any reference pattern with ample two-dimensional characteristics, such as a reference pattern with sufficient width, may be used to correct image skew or distortion in a similar manner. Whenever a skew or distortion occurs, the two-dimensional characteristics of the reference pattern will differ from characteristics of the reference data stored in the system. A correction of the distorted image may be obtained by adjusting or rotating the captured image to enable the captured pattern image to be consistent to the stored reference data.

According to one embodiment, an exemplary system provides a pattern that fills a region of interest of the camera to correct for distortions. The distortion required to change the image of the pattern to the expected image of the pattern would then be applied to all future images. For example, as shown in FIG. 7a, a known pattern, such as a grid of dots at ½" spacing and being imaged essentially parallel to the camera chip. Now all distortions in the optical system (lens, mirror . . . ) will be realized in the captured image of the grid. By distorting the captured image to make the image of the grid pattern into the known, expected ½" grid pattern, all the distortions of the system are corrected for.

A detailed process for detection and compensating for imaging distortions using known reference patterns is now described.

1. Determination the Centroids of Reference Patterns

A camera acquires a digital image of a flat plane containing a plurality of identifiable image patterns at known locations on the plane. In the present embodiment, the camera's optical axis is assumed to be normal to the plane, and each pixel of the digital image has a red, green and blue value, each between 0 and 255. These three values will be referred to as the "color" or "RGB" value of a pixel. In the present embodiment, the known patterns are circles of uniform color, and the surrounding background is of uniform color, and the color of the reference pattern is different from that of the surrounding background.

In the present embodiment, a smoothed value is first computed for each pixel in the digital image, and then a "color gradient" is computed for each smoothed pixel in the digital image.

The smoothed RGB values for pixel at image column and row (x,y) are computed using the 3×3 smoothing kernel:

$$\begin{matrix} 1 & 2 & 1 \\ 2 & 4 & 2 \\ 1 & 2 & 1 \end{matrix}$$

as follows:

smoothedPixel(x,y)=(1*rawPixel(x−1,y−1))+(2*rawPixel(x,y−1))+(1*rawPixel(x+1,y−1))+(2*rawPixel(x−1,y))+(4*rawPixel(x,y))+(2*rawPixel(x+1,y))+(1*rawPixel(x−1,y+1))+(2*rawPixel(x,y+1))+(1*rawPixel(x+1,y+1))

where "smoothedPixel" and "rawPixel" are the R, G or B values, respectively.

The color gradient is computed for each smoothed pixel in the digital image using the 3×3 Sobel filter kernels:

Kernel for X:

$$\begin{matrix} -1 & 0 & 1 \\ 0 & 0 & 0 \\ -1 & -2 & -1 \end{matrix}$$

Kernel for Y:

$$\begin{matrix} -1 & -2 & -1 \\ 0 & 0 & 0 \\ -1 & -2 & -1 \end{matrix}$$

as follows, where s is "smoothedPixel":

$gx=(-1*s(x-1,y-1))+0+(1*s(x+1,y-1))+(-2*s(x-1,y))+0+(2*s(x+1,y))+(-1*s(x-1,y+1))+0+(1*s(x+1,y+1))$ $gy=(-1*s(x-1,y-1))+(-2*s(x,y-1))+(-1*s+1,y-1))+0+0+0+(1*s(x-1,y+1))+(2*s(x,y+1))+(1*s(x+1,y+1))$ gx and gy are computed for R, G and B, and the square of the color gradient magnitude at pixel position x,y is then:

$gradSq(x,y)=$ Sum of R,G and B $[(gx*gx)+(gy*gy)]$

If the color of a smoothed pixel and its neighbors are close, this color gradient will be small. Since the pattern color is different than the surrounding background color, the color gradient of pixels at the boundary of pattern and background will be larger, and thus boundary pixels may be identified as those pixels having a color gradient larger than a suitably defined threshold value. In the present embodiment, a region of pixels enclosed by such a pixel boundary, where the parameters of the bounded region, such as size and shape, match the expected parameters of a pattern, is identified as being potentially one of the known patterns. The centroids of such regions are computed by dividing the sum of the x or y values of the pixels in the bounded region by the number of pixels in the bounded region. If the distortion of the imaging system from an ideal "pinhole camera" system is not too large, the pattern of pattern centroid positions will be the same as that of the known pattern on the plane, and the patterns thus measured may be individually identified with individual known patterns.

2. Determining and Correcting Distortion

Let KXi and KYi be the known positions of pattern i, and let MXi and MYi be the measured centroid of the region identified as matching pattern i.

Let:

$mxi=M*((\cos(\theta)*KXi)-(\sin(\theta)*KYi))+DX$ $myi=M*((\cos(\theta)*KYi)+(\sin(\theta)*KXi))+DY$ M is a magnification factor, θ is a rotation angle, and DX and DY are translational offsets. M is the ratio of the known spacing of pattern positions in the plane and the measured spacing of corresponding pattern positions in the camera image, while θ, DX and DY are computed by least-squares minimization of the sum of (mxi−MXi) squared plus (myi−MYi) squared, summed over all matched patterns, since this sum is a function of variables θ, DX and DY, given the set of known values {KXi,KXi}, from which the set {mxi,myi} are computed, and the corresponding set of measured values {Mxi,MYi}. mxi is then approximately equal to MXi, and myi is then approximately equal to Myi.

The distortion is then defined at the pixel position of pattern i as:

distortion$Xi=MXi-mxi$ distortion$Yi=MYi-myi$

The distortion at any pixel position in the "ideal" or undistorted image is then computed by bilinear interpolation, using the distortions (distortionXi,distortionYi) at the four pattern centroid positions {mxi,myi} closest to that pixel position. In this manner, the system computes and tabulates distortion correction values (distortionX, distortionY) at every undistorted image pixel position. Once the tabulated distortion correction values have been determined for a particular camera, they may be applied to any future images acquired by this camera, to produce an undistorted image. The color value for each pixel in such an undistorted image is computed by taking the x,y position of the pixel in the undistorted image, looking up the distortion values (distortionX,distortionY) for the pixel at this x,y position in the table, for this x,y in the undistorted image, and getting the color value from the pixel at (x+distortionX, y+distortionY) in the (distorted) image captured by the camera. These corrections and apply to all future images. Points on the image to be corrected that do not lie on a point on the grid can be corrected by using an average distortion of the for closest grid points.

According to another embodiment, an exemplary tool storage system of this disclosure utilizes known patterns with predetermined positional relationships therebetween, or a known pattern that extends across at least two cameras to measure a relative camera position (RCP) between the cameras and uses this RCP to stitch future images by at least two cameras together.

A process for determining an RCP between two cameras is not described. Two cameras, whose physical and mechanical positions relative to each other are fixed, each acquires a digital image of part of a flat plane containing a plurality of identifiable image patterns at known locations on the plane. The images are corrected for distortion using the technique described in earlier regarding determining and correcting distortion." The centroids of these known patterns are then determined by the technique described in the section determining the centroids of patterns. A point on the plane visible in both camera's fields of view, such as the centroid of a particular pattern, will project to position (x1,y1) in the corrected (undistorted) image of the first camera, and will project to position (x2,y2) in the corrected (undistorted) image of the second camera. It is assumed that the optical axes of the two cameras are parallel, and that their magnifications are the same.

Then (x1,y1) and (x2,y2) are related by the following transform:

$x2'=(\cos(\theta)*x1)-(\sin(\theta)*y1)+dx$ $y2'=(\cos(\theta)*y1)+(\sin(\theta)*x1)+dy$ where θ is a rotation angle, and dx and dy are translational offsets, which are computed by least-squares minimization of the sum of (x2i'−x2i) squared plus (y2i'−y2i) squared, summed over all patterns i visible in both camera's fields of view, since this sum is a function of variables θ, dx and dy, given the set of values {x1i,y1i}, from which the set {x2i', y2i} are computed, and the corresponding set of values {x2i, y2i}. x2i is then approximately equal to x2i, and y2i' is then approximately equal to y2i. The parameters θ, dx and dy then define the RCP transform relating the pair of cameras.

The inverse transform is:

$$x1=(\cos(\theta I)*x2)-(\sin(\theta I)*y2)+dxI$$

$$y1=(\cos(\theta I)*y2)+(\sin(\theta I)*x2)+dyI$$

where:

$$\theta I=-\theta$$

$$dxI=-((\cos(\theta I)*dx)-(\sin(\theta I)*dy))$$

$$dyI=-((\cos(\theta I)*dy)+(\sin(\theta I)*dx))$$

Thus, for any point on the plane visible in both camera's fields of view which projects to position (x1,y1) in the corrected (undistorted) image of the first camera, and projects to position (x2,y2) in the corrected (undistorted) image of the second camera, (x1,y1) and (x2,y2) are related by this transform.

Also, within a scale factor relating dimensions on the plane to pixels in the camera images, any point on the plane (xp,yp) may be related to either (x1,y1) or (x2,y2) by a transform of the same mathematical form.

Likewise, given a transform of the same mathematical form relating points in a first plane (x1,y1) to points in a second plane (x2,y2), with parameters {θ12,dx12,dy12}, and a transform of the same mathematical form relating points in the second plane (x2,y2) to points in a third plane (x3,y3), with parameters {θ23,dx23,dy23}, the transform of the same mathematical form relating points in a first plane (x1,y1) to points in the third plane (x3,y3), has parameters {θ13,dx13,dy13} given by:

$$\theta 13=\theta 12+\theta 23$$

$$dx13=(\cos(\theta 23)*dx12)-(\sin(\theta 23)*dy12)+dx23$$

$$dy13=(\cos(\theta 23)*dy12)+(\sin(\theta 23)*dx12)+dy23$$

As illustrated in FIG. 7b, a target or an array of targets that spans across the field of view of all the cameras is provided. Part of the target or a target of an array of targets can be seen by each camera. Knowing the targets position with respect to each other, the cameras position with respect to each other can be measured (FIG. 7c). Use the location of the relative cameras to create offsets in X and Y and a rotation of each camera to stitch one single image together (see FIG. 7d).

Imaging Setting Control

If the image sensing devices of the imaging subsystem require illumination to obtain acceptable image quality, illumination devices may be provided. For example, LEDs may be used to illuminate an area to be imaged by the image sensing devices. It is understood that numerous types of illumination sources may be used. For example, LEDs may be disposed surrounding lens or image sensors of the image sensing devices. Light emitted by the LEDs is transmitted along the same path as the camera view. In another embodiment, a light directing device, such as a mirror, may be used to direct lights emitted by an illumination source towards a target area, such as a drawer to be imaged. The timing and intensity of the illumination is controlled by the same processor that controls the camera and its exposure. In some possible configurations of cameras it may be desirable to implement background subtraction to enhance the image. Background subtraction is a well known image processing technique use to remove undesirable static elements from an image. First an image is captured with illumination off. Then a second image is captured with illumination on. The final image is created by subtracting the illumination off image from the illumination on image. Image elements that are not significantly enhanced by the illumination are thereby removed from the resulting image.

In order to properly image drawers of varying distances to a camera, appropriate settings need to be used in capturing images and/or processing the images after they are captured. These settings include illumination intensities, camera exposure time, color gains including individual parameters for each color filter in the image sensor array, aperture configurations, aperture sizes, shutter speed, f stop, threshold values for post-capturing image processing, etc. Furthermore, imaging parameters other than illuminations and exposures may differ from drawer to drawer and should be addressed during the imaging process. These additional parameters or considerations include, for example, location and size of a region of interest (ROI) for imaging within camera view; whether an ROI is redundantly imaged such that certain cameras could be shut down or turned off for power savings; and effects of parallax on ROI.

Conventional imaging techniques usually determine those needed settings based on real time detections of a distance from the camera to a target object, and then calculate needed parameters and settings on the fly. However, such real time calculations require fast and powerful processors which add cost to the system. This disclosure provides a unique algorithm that substantially reduces the calculation load to the system and significantly speeds up the calculation process.

An exemplary tool storage system according to this disclosure pre-stores reference data including a distance from each respective drawer to each camera and needed parameter settings according to the identity of each respective drawer and different lighting conditions in the environment. This reference data may be generated during the manufacture of the tool storage system. A distance from each respective camera to each respective drawer is measured and recorded. Ideal imaging parameters under different illumination conditions are determined for each recorded distance through standard means and stored in a look-up table. The look-up table also stores additional information corresponding to each respective drawer, including locations and sizes of region of interest (ROI) for imaging within camera view, whether an ROI is redundantly imaged such that certain cameras could be shut down or turned off for power savings; and effects of parallax on ROI.

During operation, the exemplary tool storage system determines the identity of a subject drawer being accessed and lighting conditions in the environment. According to the determined identity of drawer and the detected lighting conditions, the exemplary system accesses the reference data including pre-stored distance information under different lighting conditions from each camera corresponding to the subject drawer, and ideal imaging parameters according to the detected illumination conditions and the distance. Such approach removes the need for the system processor to perform complex detections and calculations to determine a distance to a subject drawer and appropriate imaging parameters for imaging the drawer. Rather, all the needed information is accessible from the pre-stored look-up table. Accordingly, suitable parameters and/or settings may be used to capture images of a respective drawer or processing/manipulating an image of a respective drawer after it is captured, so that images with sufficient quality may be obtained. In a system with multiple cameras, a single camera can be used to set the gross parameter levels for all cameras and illumination controls.

The exemplary system may determine the identity of a drawer being accessed using various manners. According to one embodiment, each drawer is associated with an identifier viewable to a camera when the drawer enters the field of view of the camera. The camera determines the identity of the drawer according to the unique identifier. For instance, the identifier may be a pattern unique to each drawer, such as a bar code, an identification number, a unique pattern, etc. The identifier may use the same pattern for all drawers but its location is unique to each drawer. It is also possible to use the same pattern placed at a constant location away from the center axis of the camera and parallax may be used to identify targets.

During operation, an initial image of a drawer is processed to search for the unique pattern that will allow the system to determine a target is in view and determine the actual distance to the target. This allows the system to determine which previously calculated illumination and exposure settings to use for subsequent images. The identifying pattern may be a separate unique image pattern for each target distance, or it may be a common pattern whose size or location allows determination of the target distance. The identifying pattern is designed to present a high contrast image to the camera that can be decoded under a wide range of illumination and exposure controls. For instance, a pattern of black circles on a white background may be used. According to still another embodiment, each drawer is provided with two reference patterns with known positional relationship, such as a known distance. Since the drawers are progressively further away from the camera, and the image of the drawer and the distance between reference patterns also get smaller. A look-up table of different distances between the reference patterns and the corresponding identities of drawer is stored in the system. When an image of a drawer is captured, the system uses the distance between the reference patterns (in pixels) and the look-up table to determine which drawer is being opened.

In another embodiment, each drawer is associated with a movement sensor, a contact sensor or a position detector for detecting a movement of each drawer. The exemplary system determines the identity of the drawer that requires imaging by determining which sensor or detector is being activated by a moving drawer, or based on a state of signal transmitted by the activated sensor or detector.

The exemplary tool storage system uses a unique approach to perform color calibration and/or adjust color gains. Each drawer is provided with a "color-coded" area with preset color attributes. The color-coded area may be any area such as background in known color, foam in known color, a sticker with known color, etc. Information related to the preset color attributes is stored in a non-volatile memory in the system.

The color-coded area is imaged under an initial condition. The image is acquired from camera sensors in a format referred to as "raw" or "raw bayer." The sensor data in raw format can be converted to various color spaces using mathematical transforms well-known to people skilled in the art, such as IHS (intensity, hue, and saturation), to allow for extracting attributes of image taken under the initial condition. The results of the conversion may be improved by using any number of statistical averaging approaches. A color offset value is generated based on a difference between the color attributes of the captured color-coded area and the preset color attributes. According to the offset value, the system determines whether any settings of the camera, such as color gains, exposures, etc., should be adjusted to achieve an appropriate image quality. In one embodiment, such adjustments are applied to all subsequent images. According to another embodiment, the system performs color calibration as discussed above for each respective image.

According to another embodiment, the initial image of the color-coded area is stored as baseline image information. All subsequent images of the color-coded area are compared with the baseline image to determine an offset. The system then determines, according to the calculated offset, whether any settings of the camera, such as color gains, exposures, etc., should be adjusted to match the baseline information. For example, for each attribute, a difference between the baseline information and subsequent images may be calculated and compared with a preset threshold value. If the difference exceeds the threshold value, the system proceeds performing an adjustment on the subsequent images. Otherwise, no adjustment functions will be performed on the images. As discussed earlier, the adjustments could be made when the images are taken or applied to the capture images after they are taken by the image sensing devices.

Techniques for adjusting attributes of images are well-known and will not be repeated. For instance, hue can be adjusted by varying the gain ratio between colors. If a white area looks like light blue, the blue detector gain can be reduced to make the area look white. For adjusting color gains and exposures, a camera has separate gain adjustments for four bayer pattern filter settings. A ratio of gains may be adjusted between various filter elements at the camera level. The exposure can be adjusted by changing the exposure time of the image during acquisition or imaging, applying an image gain as a post processing step, or by increasing light output from the illumination hardware. The intensity of the color is related to the total light returned by all color filters. If a given intensity is lower than the ideal value, all the gains can be increased, the camera exposure time can be increased, or the illumination can be set to a higher level. Saturation relates to the brilliance of a given color. Again, exposure and gain can be adjusted to match ideal levels with actual levels.

Networked Storage Systems

Figure 9:
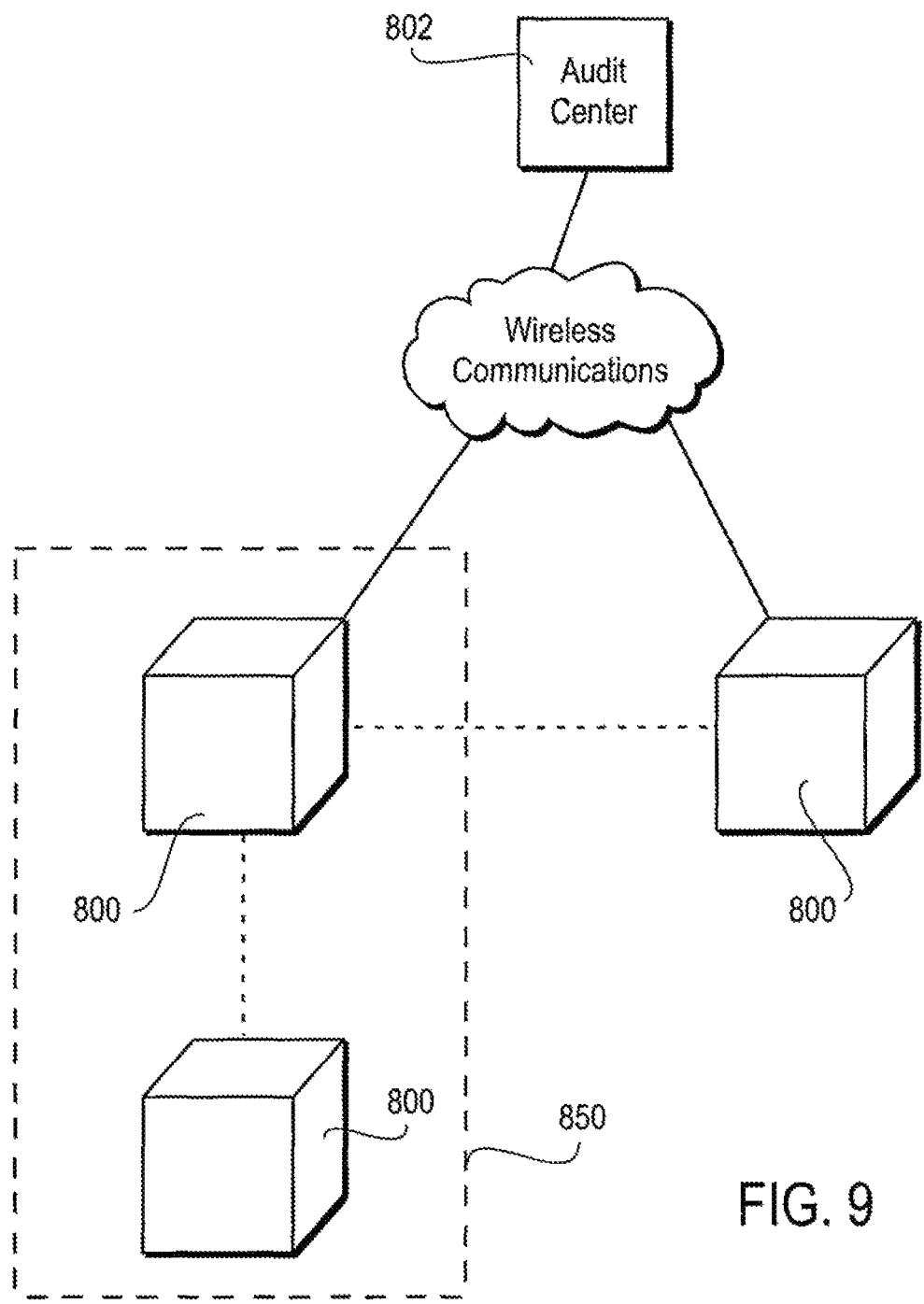
FIG. 9 is a block diagram of an exemplary networked inventory control system.

Storage systems described in this disclosure may be linked to a remote server in an audit center, such that inventory conditions in each storage system is timely updated and reported to the server. As shown in FIG. 9, a server 802 is coupled to multiple storage systems 800 via a wireless network. Server 802 may include a database server, such as a Microsoft SQL server. Information related to authentication, authorized users, inventory conditions, audit trails, etc., is stored in the database.

In one embodiment, each storage system 800 is provided with a data transceiver, such as an 802.11g or Ethernet module. The Ethernet module connects directly to the network, while an 802.11g module may connect through an 802.11g router connected to the network. Each of these network modules will be assigned a static or dynamic IP address. In one embodiment, storage systems 800 check in to the server through the data transceivers on a periodic basis, to download information about authorized users, authorization levels of different users or different keycards, related storage systems, etc. Storage systems 800 also upload information related to the systems such as inventory conditions, drawer images, tool usage, access records, information of user accessing storage systems 800, etc., to server 802. Each storage system 800 may be powered by an AC source or by a battery pack. An uninterruptible power supply (UPS) system may be provided to supply power during a power failure.

Server 802 allows a manager or auditor to review access information related to each storage system 800, such as inventory conditions and information related to each access to storage system 800 like user information, usage duration, inventory conditions, changes in inventory conditions, images of drawers or contents of the storage system, etc. In one embodiment, sear 802 may form a real time connection with a storage system 800 and download information from that storage system. The manager or auditor may also program the access control device on each storage system through server 802, such as changing password, authorized personnel, adding or deleting authorized users for each storage system, etc. Authorization data needed for granting access to each storage system 800 may be programmed and updated by server 802 and downloaded to each storage system 800. Authorization data may include passwords, authorized personnel, adding or deleting authorized users for each storage system, user validation or authentication algorithm, public key for encryptions and/or decryptions, black list of users, white list of users, etc. Other data updates may be transmitted to each storage system from server 802, such as software updates, etc. Similarly, any changes performed on storage system 800, such as changing password, adding or deleting authorized users, etc., will be updated to server 802.

For each access request submitted by a user, a storage system authenticates or validates the user by determining a user authorization according to user information input by the user via the data input device and the authorization data. According to a result of the authentication, the data processor selectively grants access to the storage system by controlling an access control device, such as a lock, to grant access to the storage system 800 or one or more storage drawers of one or more storage systems 800.

Server 802 also allows a manager to program multiple storage systems 800 within a designated group 850 at the same time. The manager may select which specific storage systems should be in group 850. Once a user is authorized access to group 850, the user has access to all storage systems within group 850. For instance, a group of storage systems storing tools for performing automotive tools may be designated as an automotive tool group, while another group of storage systems storing tools for performing electrical work may be designated as an electrical tool group. Any settings, adjustments or programming made by Server 802 in connection with a group automatically apply to all tool storage systems in that group. For instance, server 802 may program the tool storage systems by allowing an automotive technician to access all tool storage systems in the automotive tool group, but not those in the electrical tool group. In one embodiment, each system 800 only includes minimal intelligence sufficient for operation. All other data processing, user authentication, image processing, etc., are performed by server 802.

Similarly, server 802 also allows a manager to program multiple storage drawers 330 within a designated group at the same time. The manager may select which specific storage drawers, of the same system or different storage systems, should be in the group. Once a user is authorized access to the group, the user has access to all storage drawers within the group. For instance, a group of storage systems storing tools for performing automotive tools may be designated as an automotive tool group, while another group of storage systems storing tools for performing electrical work may be designated as an electrical tool group.

In another embodiment, an exemplary networked storage system as shown in FIG. 9 utilizes hierarchical authorization architecture to manage access to storage systems. One or more storage systems 800 are given the status of master storage system. Each master storage system has one or more associated slave storage systems. If a user is authorized to access to a master storage system, the same user is automatically authorized to access any slave storage system associated with that master system. On the other hand, if a user is authorized to access a slave storage system, the authorization to the slave system does not automatically grant the user access to its associated master storage system or other slave storage systems associated with the same master storage system.

According to still another embodiment, an exemplary networked storage system as shown in FIG. 9 grants user access by utilizing multiple hierarchical authorization levels. Each authorization level is associated with pre-specified storage systems, which can be programmed by a manager via server 802. When a user is assigned a specific authorization level, this user is authorized to access all storage systems associated with the assigned authorization level and all storage systems associated with all authorization levels lower than the assigned authorization level in the authorization hierarchy, but not to those associated with authorization levels higher than the assigned authorization level in the authorization hierarchy.

Audit

An exemplary inventory control system according to this disclosure tracks various types of information related to each access. For example, system 800 records date, time and/or duration for each access, and corresponding user information submitted by a user to obtain access to system 800. As discussed earlier, system 800 captures one or more images of the storage unit during each access for determining an inventory condition. The images are linked to each access and accessing user and stored in system 800. System 800 may store the information locally or upload the obtained information to server 802 via the wireless communication network, as shown in FIG. 9.

Server 802 may process and compile the information received from each system 800, to create an audit trail for each server 802. The audit trail is accessible by managers or users with suitable authorization levels. Different types of audit trails may be generated and retrieved based on preference of authorized users. For instance, an audit trail may be generated for one or more specific dates, one or more specific users, one or more specific tools, one or more IDs, etc. Additional information and analysis may be generated and provided by server 802. For example, system 802 may track usages of a specific tool over time, and generate a report summarizing a usage frequency for each tool for evaluation. Such report may be used to determine what tools are used more frequently and which tools probably are not needed because they are used less often than others. The data can be sorted by pertinent criteria such as date, user, or drawer, allowing the auditor to see the exact state of the drawer when it was opened and when it was closed.

If a particular tool is not properly detected, due to interference by some foreign objects or for whatever reason, audit center 802 generates a warning with an image of the specific area of the drawer that has an issue. This is accomplished by requesting the image for the affected area from the imaging subsystem.

According to one embodiment, system 800 displays the status of the tool storage system through a screen saver. A display of system 800 has a custom screen saver that displays in one of three different colors depending on the status of the tool control system. If all tools are checked in and the box is closed, the screen saver displays a green bouncing icon. If tools are currently checked out but the box is closed, a yellow bouncing icon is displayed. If the system is currently open a red icon is displayed.

According to another embodiment, the display of system 800 is provided with a graphical presentation of the tool storage system that dynamically updates the status of tool storage system 800. An image of tool storage system 800 is shown and the drawers will reflect the current status of the system. If a drawer is open, that drawer will be displayed in red on the display. If a drawer is closed but tools are currently checked out, that drawer will appear yellow. If the drawer is closed and all tools are present in the drawer, the drawer will be clear with a black outline.

FIG. 10*a* shows an exemplary screen of an audit trail with respect to a specific storage system 800. Each access to system 800 is identified by Date/Time 920 and user information 910 of users associated with each access. User information may include any information submitted by a user when requesting access to system 800, such as finger prints, facial recognition images, user images taken by user cameras, passwords, information stored in keycards, any information for authentication, etc. In one embodiment, data of user facial characteristics of each user is stored in system 800 or server 802. For each access, an image of a user accessing system 800 is captured by a user camera. User information submitted by the user for gaining access to system 800, such as information stored in a keycard and/or password, is collected. The captured image is compared against user facial characteristics of a user identified by the user information. System 800 or server 802 determines whether the facial characteristics of the user accessing system 800 matches facial characteristics of the user identified by the user information.

Figure 10B:
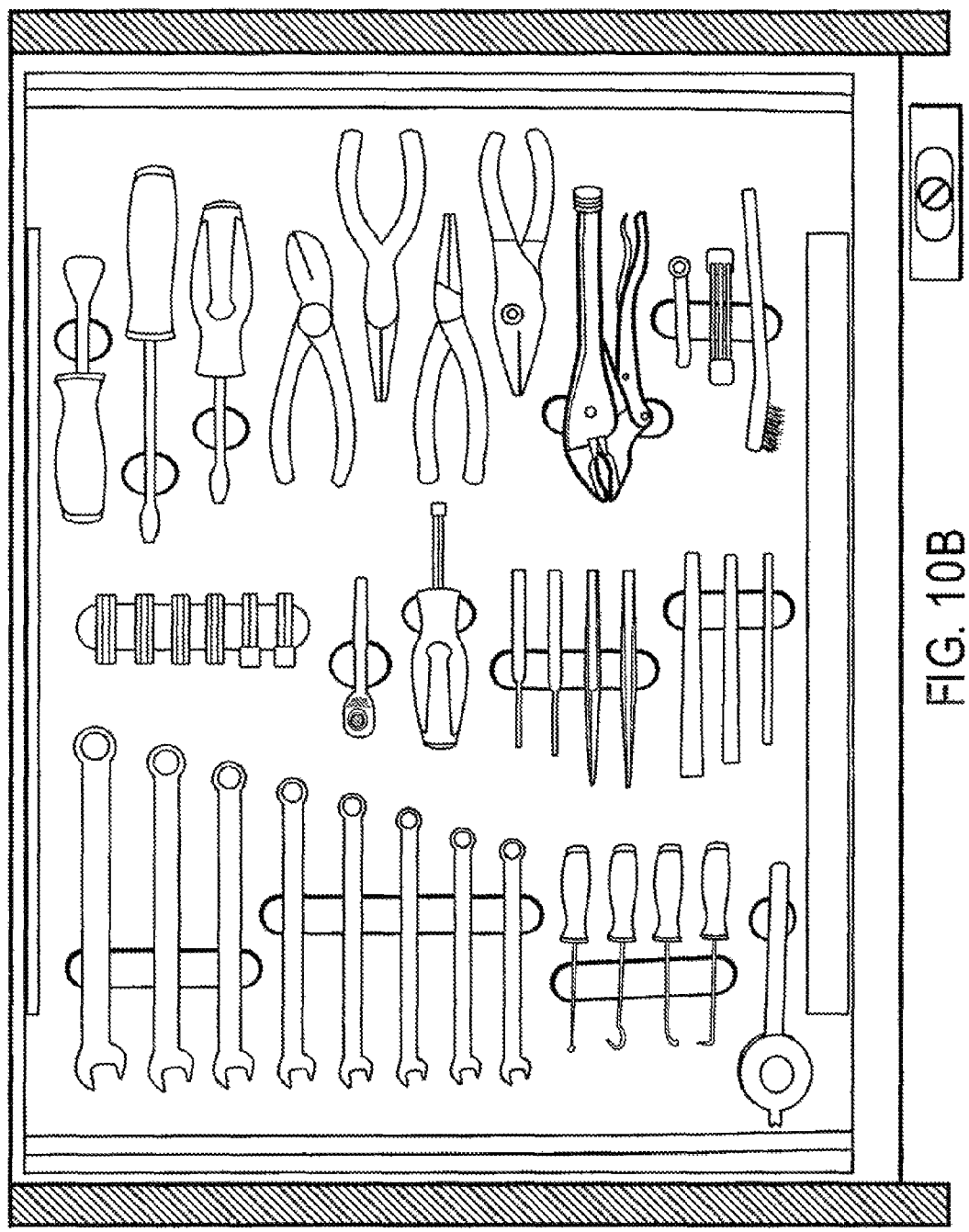
Figure 10D:
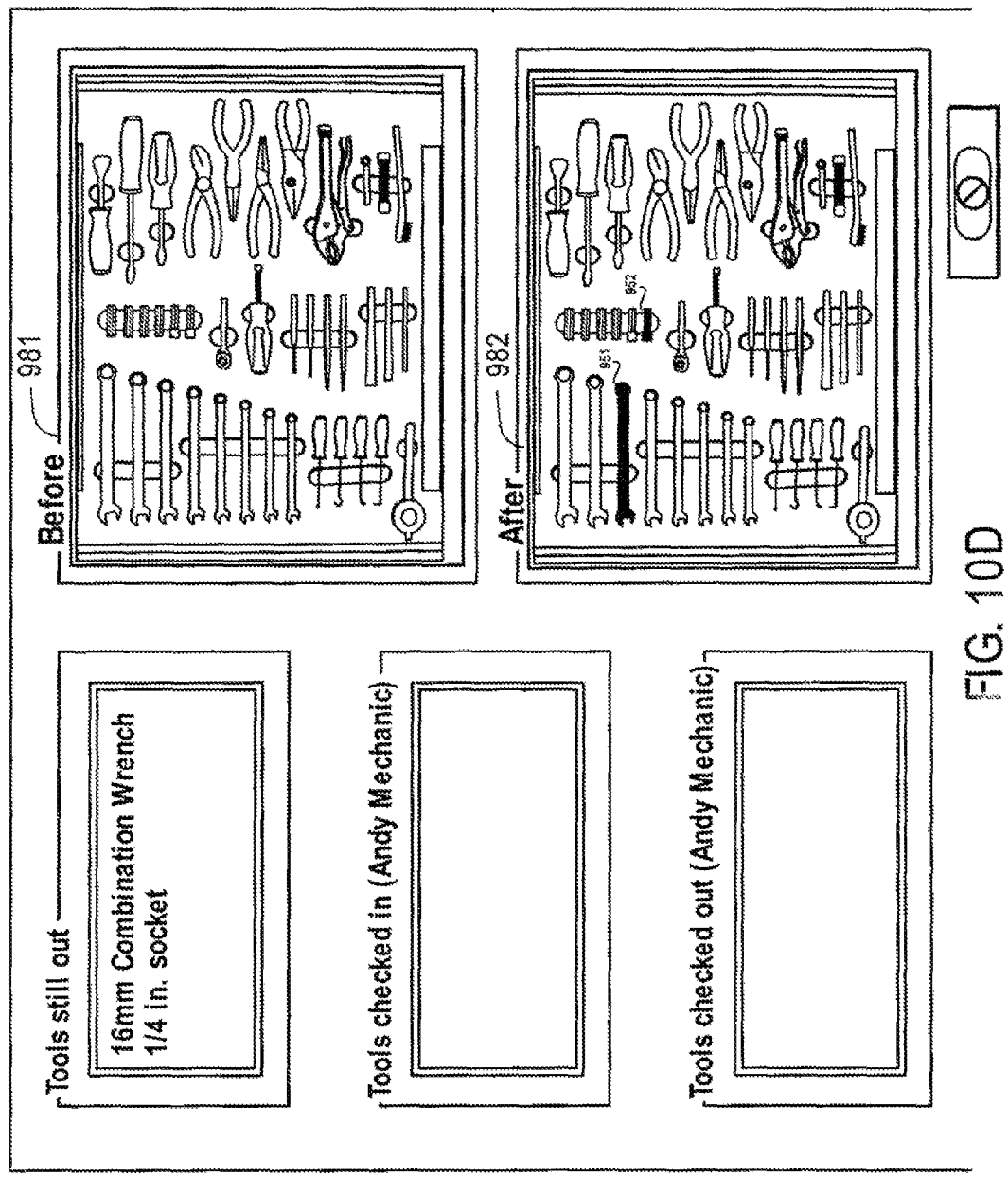

One or more images are taken during each access to storage system 800. FIG. 10*b* shows an exemplary "before access" image taken by cameras of system 800 before a user has access to the storage locations or when the drawer is moving in the first direction, as discussed earlier in this disclosure. As shown in FIG. 10*b*, each tool is properly stored in its corresponding storage location. FIG. 10*c* shows an exemplary "after access" image taken by cameras of system 800 after the access is terminated or when a storage drawer moves in the second direction as discussed earlier. As shown in FIG. 10*c*, tools corresponding to storage locations 951 and 952 are missing. Based on the image shown in FIG. 10*c*, system 800 determines that tools in storage locations 951 and 952 are missing. An audit trail is generated regarding the missing tools and the user associated with the access. FIG. 10*d* shows an exemplary record stored in system 800 and/or server 802, in which both "before access" and "after access" images 981 and 982 are stored. Missing tools are identified according to "after access" image 982 and listed in area 980.

In the previous descriptions, numerous specific details are set forth, such as specific materials, structures, processes, etc., in order to provide a thorough understanding of the present disclosure. However, as one having ordinary skill in the art would recognize, the present disclosure can be practiced without resorting to the details specifically set forth. In other instances, well known processing structures have not been described in detail in order not to unnecessarily obscure the present disclosure.

Only the illustrative embodiments of the disclosure and examples of their versatility are shown and described in the present disclosure. It is to be understood that the disclosure is capable of use in various other combinations and environments and is capable of changes or modifications within the scope of the inventive concept as expressed herein.

What is claimed is:

1. An inventory control system for determining an inventory condition of objects stored in the system, the system comprising: a plurality of storage compartments, each storage compartment including a plurality of storage locations for storing objects; an image sensing device comprising a plurality of cameras configured to capture images of the storage compartments; a data storage device storing imaging parameters corresponding to each storage compartment, the stored imaging parameters comprising known reference data identifying regions of each storage compartment within a field of view of each of the plurality of cameras; and a data processor configured to: identify a storage compartment, access the imaging parameters corresponding to the identified storage compartment and including the known reference data identifying regions of the identified storage compartment within the field of view of each of the plurality of cameras, capture images of the identified storage compartment using the plurality of cameras, determine relative positional relationships between the images captured by each camera of the plurality of cameras using the known reference data identifying regions of the identified storage compartment within the field of view of each of the plurality of cameras and stitch together the images captured by the plurality of cameras based on the determined relative positional relationships between the images, and determine an inventory condition of the objects stored in the identified storage compartment according to the-stitched together image.

2. The inventory control system of claim 1, wherein the plurality of storage compartments is a plurality of storage drawers each including a plurality of storage locations for storing objects.

3. The inventory control system of claim 1, wherein the plurality of storage compartments is a plurality of shelves each including a plurality of storage locations for storing objects.

4. The inventory control system of claim 1, wherein the data processor identifies the storage compartment by detecting an identifier unique to the storage compartment or detecting a state of a signal generated by a sensor associated with the storage compartment.

5. The inventory control system of claim 1, wherein the known reference data further include settings used in capturing the images or processing the images after they are captured.

6. The inventory control system of claim 1, wherein the inventory control system is configured to determine which of the plurality of cameras to use in capturing the images of the identified storage compartment based on the known reference data identifying regions of the identified storage compartment within the field of view of each of the plurality of cameras.

7. The inventory control system of claim 6, wherein the inventory control system is further configured to turn off one of the plurality of cameras in response to determining that a region of the identified storage compartment is redundantly imaged by another of the plurality of cameras.

8. An inventory control system for determining an inventory condition of objects stored in the system, the system comprising: storage means, including a plurality of compartments, for storing objects; imaging means comprising a plurality of cameras for capturing images of the storage means; data storage means for storing imaging parameters corresponding to each storage means, the stored imaging parameters comprising known reference data identifying regions of each compartment within a field of view of each of the plurality of cameras; and data processing means for: identifying a compartment, accessing the imaging parameters corresponding to the identified compartment and including the known reference data identifying regions of the identified compartment within the field of view of each of the plurality of cameras, capturing images of the identified compartment using the plurality of cameras, determining relative positional relationships between the images captured by each camera of the plurality of cameras using the known reference data identifying regions of the identified compartment within the field of view of each of the plurality of cameras and stitching together the images captured by the plurality of cameras based on the determined relative positional relationships between the images, and determining an inventory condition of the objects stored in the identified compartment according to the stitched together image.

9. The inventory control system of claim 8, wherein the plurality of compartments is a plurality of drawers each including a plurality of storage locations for storing objects.

10. The inventory control system of claim 8, wherein the plurality of compartments is a plurality of shelves each including a plurality of storage locations for storing objects.

11. The inventory control system of claim 8, wherein the data processing identifies the compartment by detecting an identifier unique to the compartment or detecting a state of a signal generated by a sensor associated with the compartment.

12. The inventory control system of claim 8, wherein the known reference data further include settings used in capturing the images or processing the images after they are captured.

13. The inventory control system of claim 8, wherein the inventory control system is configured to determine which of the plurality of cameras to use in capturing the images of the identified storage compartment based on the known reference data identifying regions of the identified storage compartment within the field of view of each of the plurality of cameras.

* * * * *